(12) United States Patent
Feng

(10) Patent No.: US 12,494,228 B2
(45) Date of Patent: Dec. 9, 2025

(54) VIDEO EDITING METHOD AND APPARATUS, COMPUTER DEVICE, AND STORAGE MEDIUM

(71) Applicant: Tencent Technology (Shenzhen) Company Limited, Shenzhen (CN)

(72) Inventor: Xin Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 24 days.

(21) Appl. No.: 18/200,447

(22) Filed: May 22, 2023

(65) Prior Publication Data

US 2023/0298628 A1 Sep. 21, 2023

Related U.S. Application Data

(63) Continuation of application No. PCT/CN2022/118930, filed on Sep. 15, 2022.

(30) Foreign Application Priority Data

Nov. 12, 2021 (CN) .......................... 202111342772.X

(51) Int. Cl.
*G11B 27/031* (2006.01)
(52) U.S. Cl.
CPC ................................. *G11B 27/031* (2013.01)
(58) Field of Classification Search
CPC ........ G11B 27/031; G11B 27/28; G06N 3/04; G06N 3/08; G06V 10/82; G06V 20/40; H04N 21/44; H04N 21/81; H04N 21/845
See application file for complete search history.

(56) References Cited

U.S. PATENT DOCUMENTS

| 10,381,022 B1 | 8/2019 | Chaudhuri et al. |
| 2008/0075303 A1 | 3/2008 | Kim et al. |
| 2008/0271098 A1 | 10/2008 | Kalaboukis |
| 2019/0278978 A1* | 9/2019 | Park ................... G06F 16/7834 |

(Continued)

FOREIGN PATENT DOCUMENTS

| CN | 105530440 A | 4/2016 |
| CN | 108307250 A | 7/2018 |

(Continued)

OTHER PUBLICATIONS

Tencent Technology, WO, PCT/CN2022/118930, Nov. 25, 2022, 5 pgs.
Tencent Technology, ISR, PCT/CN2022/118930, Nov. 25, 2022, 2 pgs.

*Primary Examiner* — Girumsew Wendmagegn
(74) *Attorney, Agent, or Firm* — Morgan, Lewis & Bockius LLP

(57) ABSTRACT

A video editing method is performed by a computer device. The method includes: performing music recognition on audio data in first video data to obtain a recognition result of each of audio frames in the audio data, the recognition result indicating whether the audio frame belongs to a music audio frame; determining a music segment in the audio data based on the recognition results of the audio frames, the music segment comprising a plurality of music audio frames; and extracting, from the first video data, a video clip with a same playback period as the music segment as second video data comprising the music segment.

17 Claims, 19 Drawing Sheets

(56) References Cited

U.S. PATENT DOCUMENTS

| | | |
|---|---|---|
| 2020/0234689 A1 | 7/2020 | Lai |
| 2021/0209371 A1* | 7/2021 | Zhang .................... G10L 25/54 |
| 2022/0293136 A1* | 9/2022 | Wang ............... H04N 21/47217 |
| 2023/0260326 A1* | 8/2023 | Zhou ..................... G06V 40/23 |
| | | 382/103 |

FOREIGN PATENT DOCUMENTS

| | | |
|---|---|---|
| CN | 108989882 A | 12/2018 |
| CN | 109257545 A | 1/2019 |
| CN | 110827798 A | 2/2020 |
| CN | 110944214 A | 3/2020 |
| CN | 111182347 A | 5/2020 |
| CN | 111263234 A | 6/2020 |
| CN | 112100436 A | 12/2020 |
| CN | 112445395 A | 3/2021 |
| CN | 113573161 A | 10/2021 |
| CN | 113612808 A | 11/2021 |
| CN | 114339392 A | 4/2022 |

\* cited by examiner

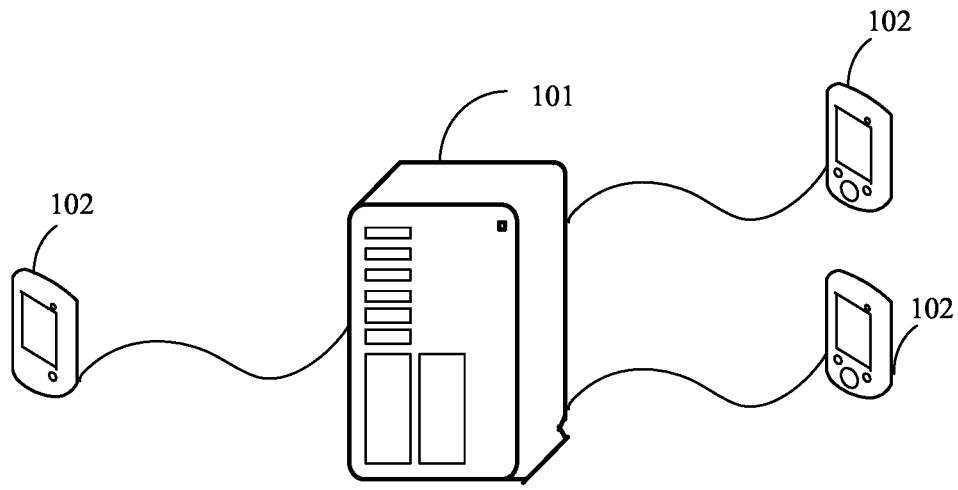

FIG. 1

| 201 |
|---|
| A computer device performs music recognition on audio data in first video data to obtain a recognition result corresponding to each audio frame in the audio data |

| 202 |
|---|
| The computer device determines a music segment in the audio data based on the recognition result corresponding to each audio frame |

| 203 |
|---|
| The computer device extracts, from the first video data, a video clip with a same playback period as the music segment as second video data comprising the music segment |

FIG. 2

VIDEO EDITING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/118930, entitled "VIDEO EDITING METHOD AND APPARATUS, COMPUTER DEVICE, AND STORAGE MEDIUM" filed on Sep. 15, 2022, which claims priority to Chinese Patent Application No. 202111342772.X, entitled "VIDEO EDITING METHOD AND APPARATUS, COMPUTER DEVICE, AND STORAGE MEDIUM" filed on Nov. 12, 2021, all of which is incorporated by reference in its entirety.

FIELD OF THE TECHNOLOGY

This application relates to the field of computer technologies, and in particular, to a video editing method and apparatus, a computer device, and a storage medium.

BACKGROUND OF THE DISCLOSURE

Video editing functions are used more and more widely in daily life. Video editing refers to intercepting a part of video clips from video data, and combining the intercepted video clips into new video data.

SUMMARY

Embodiments of this application provide a video editing method and apparatus, a computer device, and a storage medium.

According to an aspect, a video editing method is performed by a computer device. The method includes: performing music recognition on audio data in first video data to obtain a recognition result of each of audio frames in the audio data, the recognition result indicating whether the audio frame belongs to a music audio frame; determining a music segment in the audio data based on the recognition results of the audio frames, the music segment comprising a plurality of music audio frames; and extracting, from the first video data, a video clip with a same playback period as the music segment as second video data comprising the music segment.

According to another aspect, a computer device is provided. The computer device includes a processor and a memory. The memory stories at least one computer program that, when executed by the processor, causes the computer device to implement the video editing method as described above.

According to another aspect, a non-transitory computer-readable storage medium is provided. The computer-readable storage medium stores at least one computer program that, when executed by a processor of a computer device, causes the computer device to implement the video editing method as described above.

BRIEF DESCRIPTION OF THE DRAWINGS

FIG. 1 is a schematic diagram of an implementation environment according to an embodiment of this application.

FIG. 2 is a flowchart of a video editing method according to an embodiment of this application.

DESCRIPTION OF EMBODIMENTS

Figure 3:
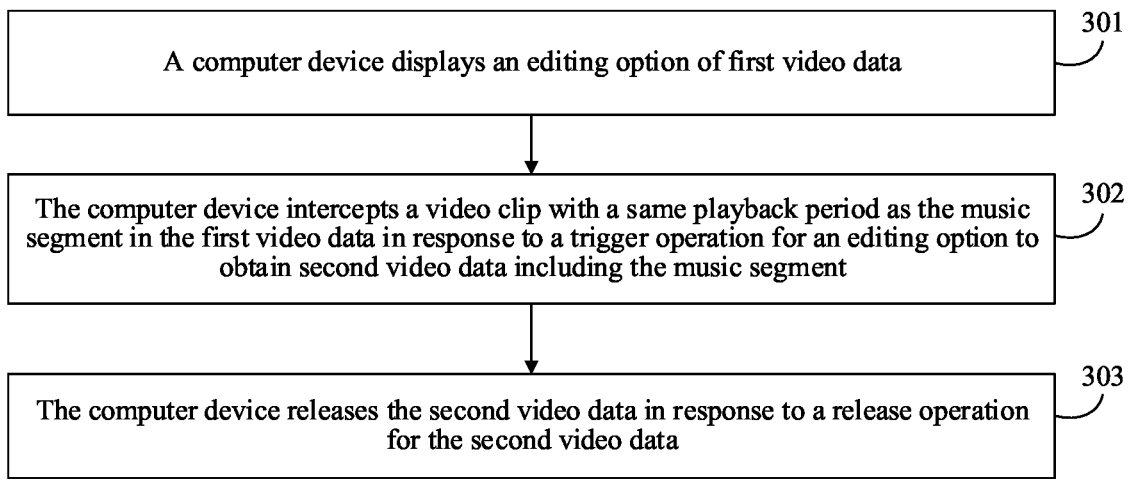
FIG. 3 is a flowchart of a video editing method according to an embodiment of this application.

To make objectives, technical solutions, and advantages of the embodiments of this application clearer, implementations of this application are described in detail below with reference to the accompanying drawings.

Video editing refers to intercepting a part of video clips from video data, and combining the intercepted video clips into new video data. In related technologies, it is usually necessary to manually intercept video clips in the video data, which may take a lot of time, so the video editing efficiency is relatively low.

Terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first music segment is referred to as a second music segment, and similarly, the second music segment is referred to as the first music segment.

The term "at least one" involved in this application refers to one or more, for example, at least one music segment means an integral number of music segments greater than or equal to one, such as one music segment, two music segments, three music segments, and the like. "A plurality of" refers to two or more, for example, a plurality of music segments mean an integral number of music segments greater than or equal to two, such as two music segments, three music segments, and the like. "Each" refers to every one of at least one, for example, each music segment refers to every music segment of a plurality of music segments, and when the plurality of music segments are 3 music segments, each music segment refers to every music segment of the 3 music segments.

For ease of understanding, concepts involved in the embodiments of this application are first explained below.

(1) Back ground music (BGM): BGM is also referred to as an underscore or background music, which usually refers to the music for conditioning atmosphere in TV dramas, movies, animations, video games and websites. When imposed in the video, the BGM can enhance the expression of emotions and achieve an effect of making the audience immersive.

(2) Mel frequency: Mel frequency is a kind of nonlinear frequency scale based on the human sensory judgment of ears on equidistant pitch changes, and is a frequency scale that can cater to the change of an auditory perception threshold of the human ears during signal processing. Audio features in the field of audio processing are obtained by using Mel frequency.

(3) Audioset: Audioset is a dataset composed of 2 million 10-second video audio tracks with labels. The label is sourced from bodies of more than 600 music events. The Audioset is used for executing assessment tasks related to audio events.

(4) Convolutional neural network (CNN): CNN is a kind of feed-forward neural network, which is composed of one or more convolution layers and fully connected layers, and also includes correlation weights and pooling layers.

(5) ffmpeg (a kind of open-source computer program): ffmpeg is a kind of open-source computer program for recording, converting and streaming audio or video, which provides a complete solution for recording, converting and streaming the audio/video, and includes advanced audio/video codec libraries.

FIG. 1 is a schematic diagram of an implementation environment according to an embodiment of this application. Referring to FIG. 1, the implementation environment includes: a server 101 and at least one terminal 102 (in FIG. 1, 3 terminals are taken as an example). The server 101 and the terminal 102 are connected directly or indirectly through a wired or wireless communication way.

The server 101 is configured to recognize a music segment in first video data, intercept the music segment in the first video data to obtain second video data including the music segment, and release the second video data in the at least one terminal 102.

In some embodiments, the server 101 is an independent physical server, or a server cluster or distributive system composed of a plurality of physical servers, or a cloud server providing cloud services, cloud databases, cloud computation, cloud functions, cloud storage, network services, cloud communication, middleware services, domain name services, security services, a content delivery network (CDN), and basic cloud computing services such as big data, artificial intelligent platforms and the like.

In some embodiments, the terminal 102 is a smart phone, a tablet computer, a notebook computer, a desktop computer, a smart speaker, a smart watch, a smart TV, a vehicle-mounted terminal, a moving picture experts group audio layer III (MP3) player, a moving picture experts group audio layer IV (MP4) player, and the like.

In some embodiments, a target client served by the server 101 is installed on the terminal 102. In some embodiments, the target client is a target client in a terminal 102 operating system, or a target client provided by a third party. The target client can play video data. In some embodiments, the target client can also have other functions, such as a comment function, a shopping function, a game function, and the like. In some embodiments, the target client is a video playback client, a content sharing client, a game client or other clients, which is not limited by the embodiments of this application.

It is to be noted that, the embodiments of this application are described only by taking the server editing the video data as an example. In another embodiment, the video data is edited by the terminal. For example, the terminal recognizes a music segment in first video data, intercepts the music segment in the first video data to obtain second video data including the music segment, and transmits the second video data to the server, and the second video data is released by the server.

The video editing method provided by the embodiments of this application is applied to various scenarios.

For example, the video editing method is applied to a scene of promoting TV dramas. Before the TV dramas are played, in order to disseminate and promote the TV dramas, the method provided by the embodiments of this application is used for intercepting video clips including BGM from video data of the TV drama. Since the video clips including the BGM are fantastic segments in the TV drama, the intercepted video clips are released on a video playback platform as a promotional video to promote the TV drama.

For example, the video editing method is also applied to a scene of sharing short videos. When a user watches a movie, and wants to share the fantastic segments, the method provided by the embodiments of this application is used for intercepting video clips including BGM from video data of the movie. Since the video clips are fantastic segments in the movie, the intercepted video clips are shared on a short video sharing platform as a short video.

FIG. 2 is a flowchart of a video editing method according to an embodiment of this application. An execution entity of the embodiments of this application is a computer device. The computer device is a terminal or a server shown in FIG. 1. Referring to FIG. 2, the method includes:

201: The computer device performs music recognition on audio data in first video data to obtain a recognition result corresponding to each audio frame in the audio data.

The music recognition in the embodiments of this application refers to recognizing whether the audio frame in the audio data belongs to a music audio frame. The music audio frame refers to an audio frame belonging to music. The music includes classical music, pop music, folk music, and the like, and the music involves music including lyrics and music excluding lyrics.

The computer device acquires to-be-edited first video data. The first video data is any type of video data such as a movie, animation, a TV drama or variety shows, and the like. The first video data includes audio data. The audio data includes a plurality of audio frames. The computer device performs the music recognition on a plurality of audio frames in the audio data, which can obtain the recognition result for each audio frame in the audio data. The recognition result of each audio frame is used for indicating whether the audio frame belongs to the music audio frame.

202: The computer device determines a music segment in the audio data based on the recognition result corresponding to each audio frame.

The music segment refers to a music segment including a plurality of consecutive music audio frames. After acquiring the recognition result of each audio frame, the computer device can determine which audio frames in the audio data belong to the music audio frame based on the recognition result of each audio frame, thereby determining the music segment in the audio data. The music segment is the BGM of the audio data.

203: The computer device extracts, from the first video data, a video clip with a same playback period as the music segment as second video data comprising the music segment.

Since a playback duration of the audio data included in the first video data is equal to that of the first video data, a start playback time point of the first video data is the same as the audio data, and an end playback time point of the first video data is also the same as the audio data, the playback time points of the first video data are in one-to-one correspondence with the playback time points of the audio data, and the playback period of the music segment in the audio data is the same as the music segment in the first video data.

The computer device determines the playback period of the music segment in the audio data, and intercepts the video clip with the same playback period from the first video data to obtain second video data including the music segment, that is, the second video data includes the BGM.

According to the technical solution provided by the embodiments of this application, the music segment in the audio data is determined by performing music recognition on the audio data in the video data, and the video clip including the music in the video data is located automatically based on an appearance position of the music segment in the video data, so that the video clip including the music is intercepted from the video data, thereby realizing an automatic flow of the video editing without editing the video manually, and improving the video editing efficiency.

FIG. 3 is a flowchart of a video editing method according to an embodiment of this application. An execution entity of the embodiments of this application is a computer device. The computer device is a terminal shown in FIG. 1. Referring to FIG. 3, the method includes:

301: The computer device displays an editing option of the first video data.

The first video data is to-be-edited video data. The editing option of the first video data is used for editing the first video data.

302: The computer device extracts, from the first video data, a video clip with a same playback period as the music segment in response to a trigger operation for the editing option to obtain the second video data including the music segment.

When the management personnel of the video data wants to edit the first video data, the trigger operation for the editing option is performed, for example, the trigger operation is a click operation, a sliding operation, or a drag operation, and the like. The computer device determines a music segment in the first video data in response to the trigger operation for the editing option. The music segment is the BGM in the video data. The computer device extracts, from the first video data, the video clip with the same playback period as the music segment to obtain the second video data. The second video data includes the music segment. Therefore, the second video data including the BGM is obtained.

In a possible implementation, the computer device adopts the video editing method provided by the embodiment of FIG. 2 to extract the video clip including the music segment from the first video data. The video clip is determined as the second video data.

303: The computer device releases the second video data in response to a release operation for the second video data.

When the management personnel of the video data wants to release the second video data, the release operation for the second video data is performed by the computer device. The computer device releases the second video data in response to the release operation for the second video data, thereby disseminating the second video data, so that more accounts can watch the second video data.

According to the technical solution provided by the embodiments of this application, only by performing the trigger operation for the editing option of the first video data, the computer device may automatically extract the second video data including the music segment from the first video data without manually performing a complicated editing operation, thereby improving the video editing efficiency. Moreover, since the automatically edited second video data includes the music segment, the information density contained by the second video data is higher. Therefore, to release the second video data is conducive to increasing hits of the video data.

Figure 4:
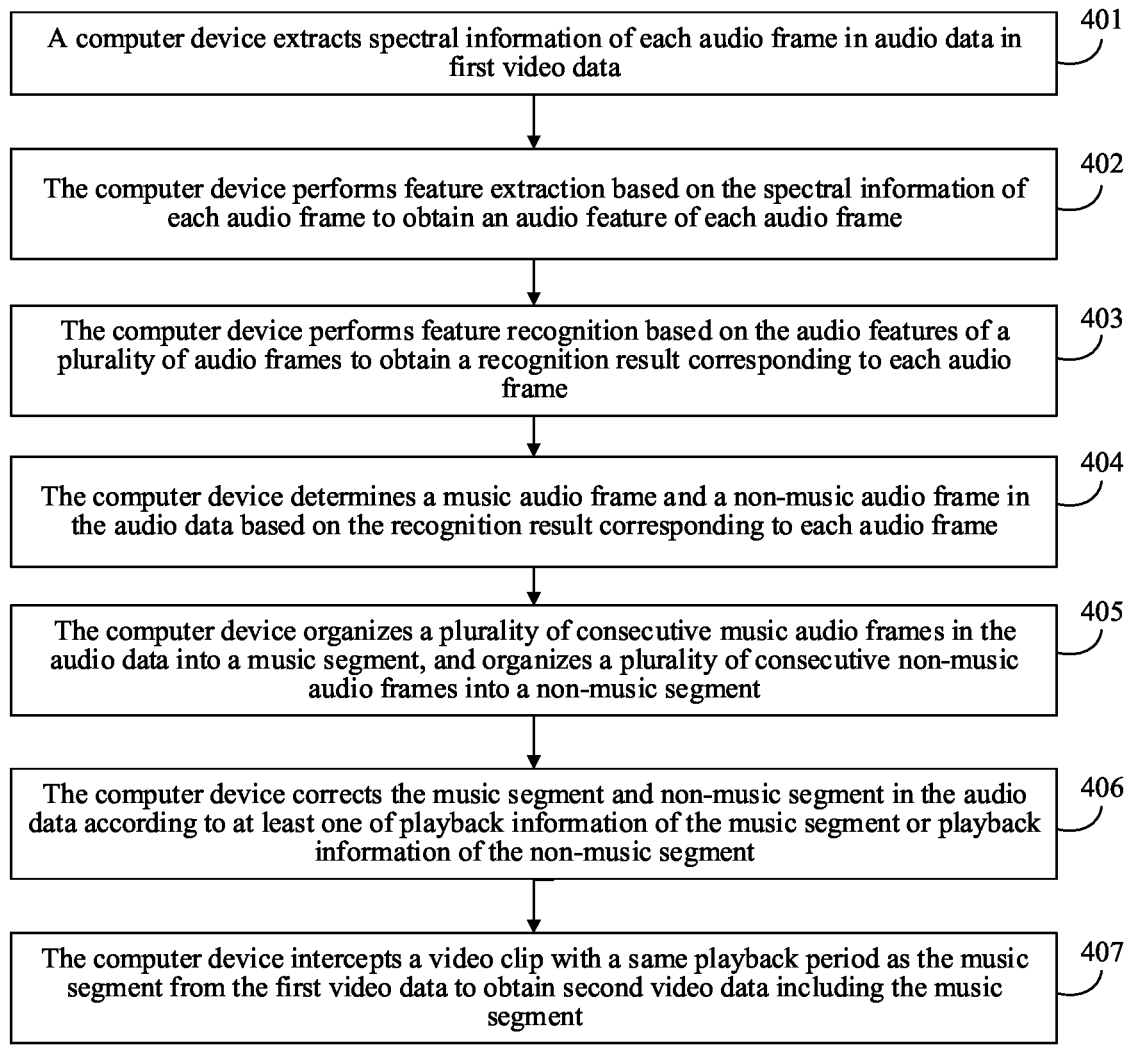
FIG. 4 is a flowchart of a video editing method according to an embodiment of this application.

FIG. 4 is a flowchart of a video editing method according to an embodiment of this application. An execution entity of the embodiments of this application is a computer device. The computer device is a terminal or a server shown in FIG. 1. Referring to FIG. 4, the method includes:

401: The computer device extracts spectral information of each audio frame in audio data in first video data.

The first video data includes the audio data. The audio data includes a plurality of audio frames. The spectral information of the audio frame is used for indicating a feature of the audio frame in a frequency domain. The spectral information is any type of spectral information, for example, the spectral information is Mel frequency information or Mel cepstral information, and the like.

In some embodiments, the computer device performs audio extraction on the first video data to obtain audio data in the first video data. For example, the computer device extracts the audio data in the first video data by using ffmpeg. In some embodiments, after obtaining the audio data, the computer device performs framing and windowing on the audio data to obtain a plurality of audio frames in the audio data. In some embodiments, the audio frame in the audio data is an audio frame of a millisecond scale.

In some other embodiments, the computer device performs frequency-domain transformation on each audio frame to obtain energy spectrum information of each audio frame, and filters the energy spectrum information of each audio frame to obtain spectral information of each audio frame.

Figure 5:
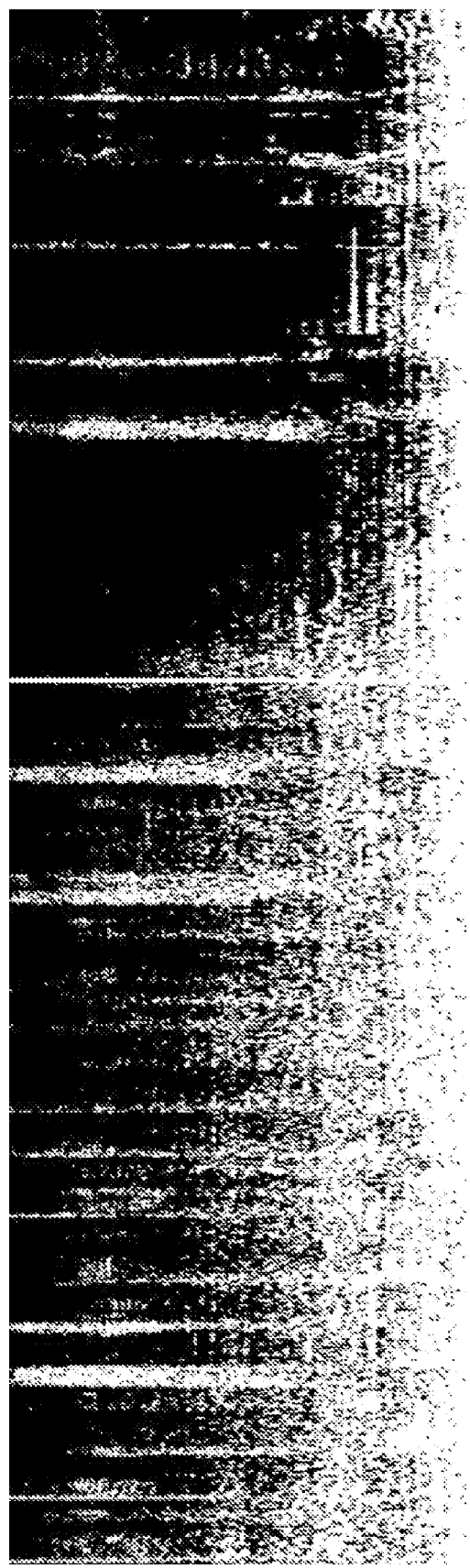
FIG. 5 is a schematic diagram of energy spectrum information according to an embodiment of this application.

The energy spectrum information of the audio frame is used for indicating signal energy in a unit frequency band. In some embodiments, the computer device performs Fourier transformation on the audio frame to obtain the energy spectrum information of the audio frame. For example, the Fourier transformation is short-time Fourier transform (STFT). The energy spectral information is STFT energy spectrum information. The STFT energy spectrum information includes STFT amplitude information and STFT phase information. The STFT energy spectrum information of the audio frame is shown in FIG. 5.

Figure 6:
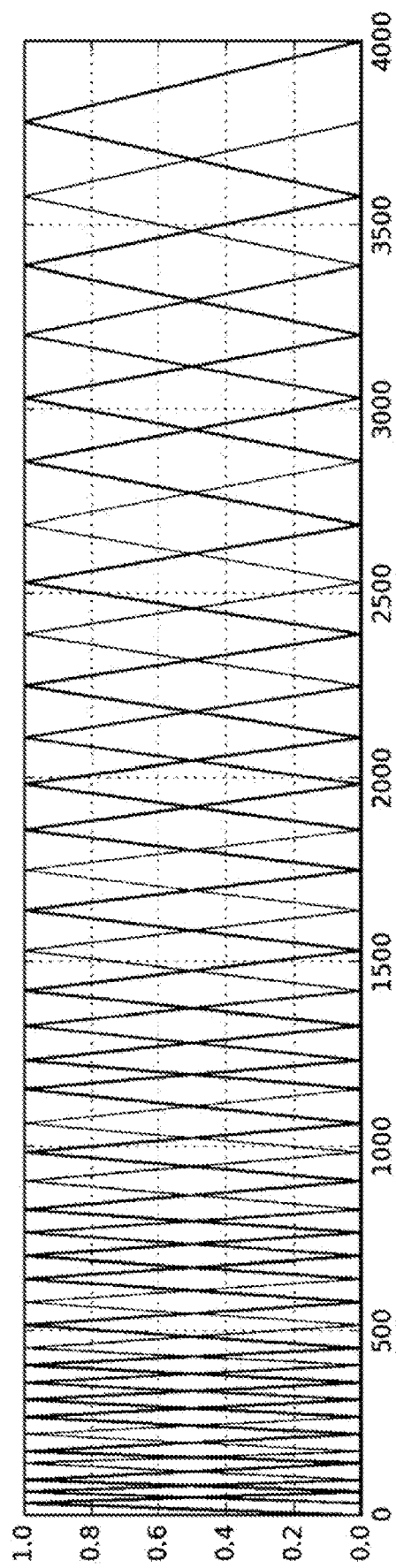
FIG. 6 is a schematic diagram of a Mel filter according to an embodiment of this application.

In some embodiments, the computer device adopts a Mel filter to perform Mel filtration on the energy spectrum information of the audio frame to obtain Mel frequency information of the audio frame, and calculates logarithm of the Mel spectral information of the audio frame to obtain Mel cepstral information of the audio frame. The Mel cepstral information is determined as the spectral information of the audio frame. The Mel filter is shown in FIG. 6, where a horizontal coordinate indicates a filter frequency, and a vertical coordinate indicates a filter amplitude.

Figure 7:
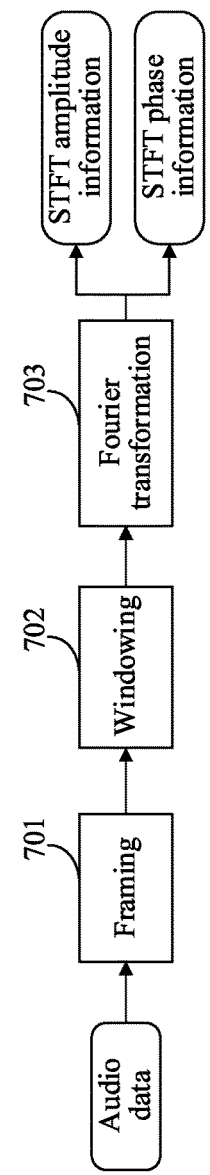
FIG. 7 is a flowchart of an energy spectrum information extraction method according to an embodiment of this application.

FIG. 7 is a flowchart of an energy spectrum information extraction method according to an embodiment of this application. As shown in FIG. 7, the method includes the following steps: 701: The computer device performs framing on the audio data to obtain a plurality of audio frames in the audio data; 702: The computer device performs windowing on a plurality of audio frames obtained by framing to obtain a plurality of windowed audio frames, and two adjacent audio frames in the plurality of audio frames are partially overlapped; 703: The computer device performs Fourier transformation on the plurality of acquired audio frames to obtain spectral information of each audio frame, the spectral information including STFT amplitude information and STFT phase information. It is to be noted that, two audio frames have an overlapped portion, which refers to that after the windowing, two adjacent audio frames have an overlapped playback period. In another word, two adjacent audio frames have an overlapped audio signal on a time domain.

402: The computer device performs feature extraction based on the spectral information of each audio frame to obtain an audio feature of each audio frame.

After acquiring the spectral information of each audio frame, the computer device extracts the audio feature of each audio frame based on the spectral information of a plurality of audio frames. In some embodiments, the audio features are feature vectors, feature matrix or feature maps, and the like, which are not limited by the embodiments of this application.

The method for extracting the audio feature of the first audio frame by the computer device is described by taking the first audio frame as an example. The first audio frame is any audio frame in the audio data.

In some embodiments, the computer device organizes a first number of preceding audio frames of the first audio frame, the first audio frame and a second number of follow-up audio frames of the first audio frame into a frame set, performs feature extraction on the spectral information of a plurality of audio frames in the frame set, and determines the extracted audio feature as the audio feature of the first audio frame.

The preceding audio frames of the first audio frame are audio frames located before the first audio frame. The follow-up audio frames of the first audio frame are audio frames located after the first audio frame. The first number of preceding audio frames are the first number of audio frames located before the first audio frame in the audio data. The second number of follow-up audio frames are the second number of audio frames located after the first audio frame in the audio data. In some embodiments, the first number and the second number are preset by the computer device. The first number and the second number are same or different. For example, the number of the audio frames in the frame set where the first audio frame belongs is preset as 96, the first number is 47, the second number is 48, or the first number and the second number are set in other numerical values.

In the embodiment of this application, when the audio feature of the audio frame is extracted, not only is the spectral information of the audio frame considered, but also the spectral information of the preceding audio frames and follow-up audio frames of the audio frame may be considered. Therefore, the extracted audio feature includes an inter-frame relationship between the audio frames. The information of the audio feature is richer, so that the accuracy of subsequent feature recognition by using the audio feature is higher.

In some embodiments, after determining the frame set of the first audio frame, the computer device combines the spectral information of a plurality of audio frames in the frame set to obtain fused spectral information, performs feature extraction on the fused spectral information to obtain the audio feature, and determines the audio feature as the audio feature of the first audio frame. For example, the spectral information of each audio frame is 64-order one-dimension spectral information. In a case where the frame set includes 96 audio frames, the computer device combines the spectral information of the 96 audio frames into 96*64 two-dimension fused spectral information.

In some embodiments, when the number of preceding audio frames of the first audio frame is less than the first number, the computer device fills at least one audio frame before the first audio frame, so that the number of the preceding audio frames of the first audio frame is equal to the first number. In some embodiments, when the number of follow-up audio frames of the first audio frame is less than the second number, the computer device fills at least one audio frame after the first audio frame, so that the number of the follow-up audio frames of the first audio frame is equal to the second number.

In a case where the number of preceding audio frames of the first audio frame is insufficient, the computer device fills at least one audio frame before the first preceding audio frame of the first audio frame, that is, fills at least one audio frame before the first audio frame of the audio data. For example, when the total number of the preceding audio frames of the first audio frame is a third number, and the third number is less than the first number, the computer device determines a difference between the first number and the third number as a fourth number, and fills the fourth number of audio frames before the first preceding audio frame. In a case where the number of follow-up audio frames of the first audio frame is insufficient, the computer device fills at least one audio frame after the first follow-up audio frame of the first audio frame, that is, fills at least one audio frame after the last audio frame of the audio data.

In some embodiments, the computer device acquires at least one blank audio frame, and determines the at least one blank audio frame as a to-be-filled audio frame. In some embodiments, the computer device duplicates at least one first audio frame, and determines the at least one audio first audio frame as the to-be-filled audio frame.

In some embodiments, the computer device performs feature extraction on the spectral information of the first audio frame to obtain the audio feature of the first audio frame.

403: The computer device performs feature recognition based on the audio features of a plurality of audio frames to obtain the recognition result corresponding to each audio frame.

After determining the audio feature of each audio frame, the computer device performs feature recognition on each audio frame in the audio data based on the audio features of the plurality of audio frames to obtain a recognition result of each audio frame, and the recognition result of each audio frame indicates whether the audio frame belongs to a music audio frame.

In some embodiments, the computer device performs feature transformation based on the audio features of a plurality of audio frames to obtain an associated feature of each audio frame, and performs classification based on the associated feature of each audio frame to obtain the recognition result of each audio frame.

The associated feature of the audio frame indicates an association relationship between the audio frame and the preceding audio frames and the follow-up audio frames. The association relationship is also referred to as the inter-frame relationship. Since there is a certain association relationship between two adjacent audio frames in the audio data, for example, when a certain audio frame belongs to the music audio frame, the possibility that the preceding audio frame and follow-up audio frame adjacent to the audio frame belong to the music audio frame is high, the computer device classifies the audio frame based on the associated feature of the audio frame to obtain the recognition result of the audio frame.

In some embodiments, the computer device performs binary classification on each audio frame. The recognition result of the audio frame includes a first numerical value and a second numerical value. The first numerical value indicates that the audio frame belongs to the music audio frame. The second numerical value indicates that the audio frame belongs to a non-music audio frame. In some embodiments, the recognition result of the audio frame is a classification numerical value, and the classification numerical value indicates the possibility that the audio frame belongs to the music audio frame.

It is to be noted that, step 401 to step 403 described above are only taken as an example for describing the process in which the computer device performs music recognition on the audio data in the first video data to obtain the recognition result of each audio frame in the audio data. In addition, the computer device can also adopt other methods to perform the music recognition on the audio data to obtain the recognition result of each audio frame. For example, the computer device invokes a music recognition model to perform the music recognition on the audio data to obtain the recognition result of each audio frame. For details of the process of invoking the music recognition model, refer to the embodiment of FIG. 13, which is not described herein.

404: The computer device determines a music audio frame and a non-music audio frame in the audio data based on the recognition result corresponding to each audio frame.

Since the recognition result of the audio frame can indicate whether the audio frame belongs to the music audio frame, the computer device can determine which audio frames in the audio data belong to the music audio frame, and which audio frames belong to the non-music audio frame based on the recognition result of the audio frame. In the embodiments of this application, by taking a frame as a unit, each music audio frame and non-music audio frame in the audio data are recognized respectively. The granularity of music recognition is positioned to a frame scale, thereby improving the accuracy of music recognition is improved.

In some embodiments, the recognition result of the audio frame is a classification numerical value, and the classification numerical value indicates the possibility that the audio frame belongs to the music audio frame. In a case where the classification numerical value of the audio frame is greater than a classification threshold, the computer device determines the audio frame as the music audio frame. In a case where the classification numerical value of the audio frame is not greater than the classification threshold, the computer device determines the audio frame as the non-music audio frame. In some embodiments, the classification threshold is preset by the computer device according to historical data. The historical data refers to the classification threshold adopted in the historical classification process.

Figure 8:
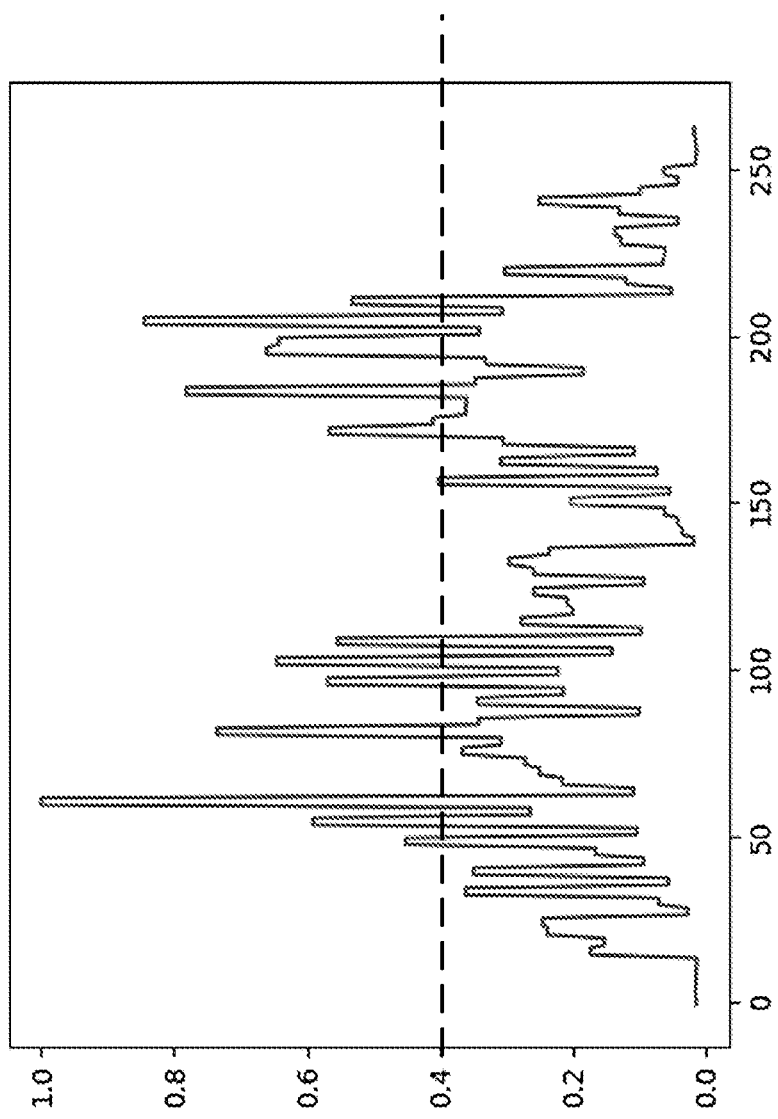
FIG. 8 is a schematic diagram of a classification numerical value according to an embodiment of this application.

FIG. 8 is a schematic diagram of a classification numerical value according to an embodiment of this application. As shown in FIG. 8, the horizontal coordinate indicates different audio frames, and the vertical coordinate indicates the classification numerical value of the audio frame. The classification numerical value of the audio frame is between 0 and 1. In a case where the classification threshold is 0.4, the computer device determines the audio frame with the classification numerical value greater than 0.4 as the music audio frame, and determines the audio frame with the classification numerical value not greater than 0.4 as the non-music audio frame.

405: The computer device organizes a plurality of consecutive music audio frames in the audio data into a music segment, and organizes a plurality of consecutive non-music audio frames into a non-music segment.

The music segment refers to the music segment including a plurality of consecutive music audio frames. The non-music segment refers to the music segment including a plurality of consecutive non-music audio frames. Therefore, the computer device determines a plurality of consecutive music audio frames in the audio data, and organizes the plurality of music audio frames into a music segment. In a case where there are a plurality of groups of different consecutive music audio frames in the audio data, each group of music audio frames constitutes a music segment, thereby obtaining a plurality of music segments. Similarly, the computer device determines a plurality of consecutive non-music audio frames in the audio data, and organizes the plurality of non-music audio frames into a non-music segment. In a case where there are a plurality of groups of different consecutive non-music audio frames, each group of non-music audio frames constitutes a non-music segment, thereby obtaining a plurality of non-music segments.

406: The computer device corrects the music segment and non-music segment in the audio data according to at least one of playback information of the music segment or playback information of the non-music segment.

After determining the music segment and non-music segment in the audio data, the computer device acquires at least one of the playback information of the music segment or the playback information of the non-music segment, and corrects the music segment and the non-music segment in the audio data according to the acquired playback information. For example, the music segment is re-corrected to be the non-music segment, or the non-music segment is re-corrected to be the music segment, or a plurality of consecutive music segments are re-combined into a music segment, or a plurality of consecutive non-music segments are re-combined into a non-music segment. The playback information is used for indicating a playback situation of the audio segment, for example, the playback information includes a playback duration, a playback time point or a playback period, and the like.

In the embodiments of this application, after determining the music segment and non-music segment in the audio data, the music segment and the non-music segment in the audio data may also be corrected based on the playback information. The corrected music segment and non-music segment take into account the playback situation in the audio data, so that the accuracy of the determined music segment and non-music segment is improved.

In some embodiments, the computer device corrects the music segment and non-music segment in the audio data, which includes at least one of the following manners.

First manner: the playback information includes the playback duration. In a case where there is a first non-music segment between a first music segment and a second music segment, and the playback duration of the first non-music segment is less than the first duration, the computer device combines the first music segment, the second music segment and the first non-music segment into a music segment. The first music segment, the second music segment and the first non-music segment all are audio segments in the audio data. A first duration is a numerical value greater than 0.

The computer device determines the playback duration of each music segment and each non-music segment in the audio data. In a case where there is a non-music segment between the two music segments, and the playback duration of the non-music segment is relatively short, it is considered that the non-music segment is recognized incorrectly, or the non-music segment does not belong to the music, but is interposed in a complete music, so that the computer device combines the two music segments and the non-music segment into a new music segment.

For example, the first music segment and the second music segment belong to the same music, and the first non-music segment between the first music segment and the second music segment is a monologue interposed in the music, so that the first music segment, the second music segment and the first non-music segment are combined into a music segment, which is conducive to preventing the same music from being divided into two portions, thereby further improving the accuracy of music recognition.

Second manner: the playback information includes the playback duration. In a case where there is a third music segment between a second non-music segment and third non-music segment, and the playback duration of the third music segment is less than a second duration, the computer device combines the second non-music segment, the third non-music segment and the third music segment into a non-music segment. The second non-music segment, the third non-music segment and the third music segment all are audio segments in the audio data. A second duration is a numerical value greater than 0.

The computer device determines the playback duration of each music segment and each non-music segment in the audio data. In a case where there is a music segment between the two non-music segments, and the playback duration of the music segment is relatively short, it is considered that the music segment is recognized incorrectly, or the music segment is not a complete music, so that the computer device combines the two non-music segments and the music segment into a new non-music segment.

For example, both the second non-music segment and the third non-music segment belong to a dialog of characters, the third music segment between the second non-music segment and the third non-music segment is a short sound effect interposed in the dialog of characters. In a case where the third music segment is reserved, the video clip intercepted subsequently according to the third music segment includes only one sound effect but no complete music. Therefore, the second non-music segment, the third non-music segment and the third music segment are combined into a non-music segment, which further improves the accuracy of music recognition, and is conducive to avoiding subsequent interception of video clips that do not include the music.

Third manner: the playback information includes the playback duration. In a case where the playback duration of a fourth music segment is less than a third duration, the computer device corrects the fourth music segment to be a non-music segment. The fourth music segment is the audio segment in the audio data. A third duration is a numerical value greater than 0.

The computer device determines the playback duration of each music segment and each non-music segment in the audio data. In a case where the playback duration of the music segment is relatively short, it is considered that the music segment is recognized incorrectly, or the music segment is not a complete music, so that the music segment is corrected to be a non-music segment. By filtering the music segment with relatively short playback duration, it can be avoided that the music included in the subsequently intercepted video clip is not rich enough, which is conducive to improving the quality of the intercepted video clip.

Fourth manner: the playback information includes a playback period. In a case where the playback period of a fifth music segment is within a start period of the audio data, the computer device corrects the fifth music segment to be a non-music segment; or, the fifth music segment is corrected to be a non-music segment when the playback period of the fifth music segment is within an end period of the audio data. The fifth music segment is the audio segment in the audio data.

The start period of the audio data refers to a period within the fourth duration after the start playback time point of the audio data. The end period refers to a period within the fifth duration before the end playback time point of the audio data. Both the fourth duration and the fifth duration are numerical values greater than 0. For example, the fourth duration is 5 minutes, and the fifth duration is 10 minutes, and the like.

In the embodiments of this application, to recognize the music segment is to intercept the video clip including the music segment in the first video data to be used as a fantastic segment in the first video data. However, considering that the first video data is a movie and TV drama, the content in the start period of the first video data is a title of the movie and TV drama, the content of the end period is tail leader of the movie and TV drama, or the content in the start period and end period of the first video data is advertisement. The content carried by the advertisement is not the wonderful segment of the movie and TV drama. The music segment is filtered by correcting the music segments within the start period and end period as the non-music segment in advance, which is conducive to ensuring the quality of the subsequently intercepted video clip.

It is to be noted that, according to the embodiments of this application, the process of determining the music segment in the audio data based on the recognition result of each audio frame is described only by taking the performing of step 404-step 406 as an example. In addition, the computer device can also adopt other methods to determine the music segment. For example, the computer device determines the music audio frame in the audio data directly based on the recognition result of each audio frame, and organizes a plurality of consecutive music audio frames into the music segment without correcting the music segment and non-music segment in the audio data.

In some embodiments, the recognition result of the audio frame is a classification numerical value, and the classification numerical value indicates the possibility that the audio frame belongs to the music audio frame. In a case where the classification numerical value of the audio frame is greater than a classification threshold, the computer device determines the audio frame as the music audio frame, and organizes a plurality of consecutive music audio frames in the audio data into a music segment.

407: The computer device extracts, from the first video data, the video clip with the same playback period as the music segment to obtain the second video data including the music segment.

Since the playback time points in the first video data are in one-to-one correspondence with the playback time points in the audio data, the playback period of the music segment in the audio data is the same as the music segment in the first video data. The computer device intercepts the video clips with the playback period as the music segment from the first video data to obtain the second video data. The audio segment included by the second video data is the music segment.

In some embodiment, the number of music segments in the audio data is multiple, that is, in step 401 to step 406, the computer device can determine a plurality of music segments. In step 407, the computer device intercepts the video clips with the same playback period as each music segment respectively from the first video data so as to obtain a plurality of second video data.

Figure 9:
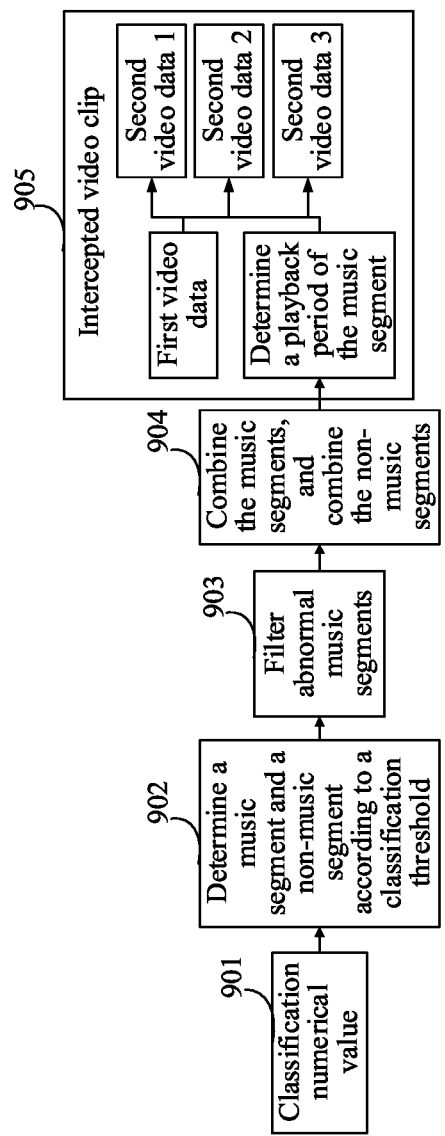
FIG. 9 is a flowchart of a video clip interception method according to an embodiment of this application.

FIG. 9 is a flowchart of a video clip interception method according to an embodiment of this application. As shown in FIG. 9, the method includes the following steps:

901: The computer device acquires a classification numerical value of each audio frame.

902: The computer device determines the music audio frame and non-music audio frame in the audio data according to the classification threshold and the classification numerical value of each audio frame, organizes the consecutive music audio frames into the music segment, and organizes the consecutive non-music audio frames into the non-music segment.

903: The computer device corrects the music segment with the playback duration less than the third duration to be the non-music segment, and corrects the music segment within the start playback period and the end playback period to be the non-music segment, thereby filtering the abnormal music segment.

904: The computer device combines two music segments and the non-music segment with the playback duration less than the first duration between the two music segments into a new music segment, and combines the two non-music segments and the music segment with the playback duration less than the second duration between the two non-music segments into a new non-music segment.

905: The computer device determines the playback period of each music segment, and intercepts the video clip of each playback period from the first video data to obtain a plurality of second video data. In FIG. 9, obtaining the second video data 1, the second video data 2 and the second video data 3 is taken as an example for description.

According to the technical solution provided by the embodiments of this application, the music segment in the audio data is determined by performing music recognition on the audio data in the video data, and the video clip including the music in the video data is located automatically based on an appearance position of the music segment in the video data so as to intercept the video clip including the music from the video data. An editing method for automatically recognizing the music segment and locating the video clip based on the music segment is provided, which realizes the automatic process of video editing without manually marking and editing the video data, thereby reducing the time cost and labor cost of the video editing, and improving the editing efficiency.

Moreover, considering that the video clip including the music in the video data is a fantastic video clip, the fantastic video clip in the video data is located according to an appearance situation of the music segment in the video data, which not only can realize the automatic editing of the video, but also can ensure the quality of the edited video clip without manually screening the fantastic segments in the video data.

Moreover, by taking a frame as a unit, each music audio frame and non-music audio frame in the audio data are recognized respectively. The granularity of music recognition is positioned to a frame scale, so that the accuracy of music recognition is improved.

Moreover, when the audio feature of the audio frame is extracted, not only is the spectral information of the audio frame considered, but also the spectral information of the preceding audio frames and follow-up audio frames of the audio frame may be considered. Therefore, the extracted audio feature includes an inter-frame relationship between the audio frames. The information of the audio feature is richer, so that the accuracy of subsequent feature recognition by using the audio feature is higher.

Moreover, after determining the music segment and non-music segment in the audio data, the music segment and non-music segment in the audio data may also be corrected based on the playback information. The corrected music segment and non-music segment take into account the playback situation in the audio data, so that the accuracy of the determined music segment and non-music segment is improved.

Moreover, the two music segments and the non-music segment with relatively short playback duration between the two music segments are combined into a music segment, which is conducive to preventing the same music from being divided into two portions, thereby further improving the accuracy of music recognition.

Moreover, the two non-music segments and the music segment with relatively short playback duration between the two non-music segments are combined into a non-music segment, which is conducive to avoiding the subsequent interception of video clips that do not include the music, thereby further improving the accuracy of music recognition.

Moreover, by filtering the music segment with relatively short playback duration, it can be avoided that the music included in the subsequently intercepted video clip is not rich enough, which is conducive to improving the quality of the intercepted video clips.

In another embodiment, the computer device stores a music recognition model. The music recognition model is configured to recognize the music audio frames in the audio data. The music recognition model includes a spectrum extraction sub-model, a feature extraction sub-model and a feature recognition sub-model. The spectrum extraction sub-model is connected with the feature extraction sub-model. The feature extraction sub-model is connected with the feature recognition sub-model. The spectrum extraction sub-model is configured to extract the spectral information of the audio frame. The feature extraction sub-model is configured to extract the audio feature of the audio frame. The feature recognition sub-model is configured to recognize whether the audio frame is a music audio frame based on the audio feature.

Figure 10:
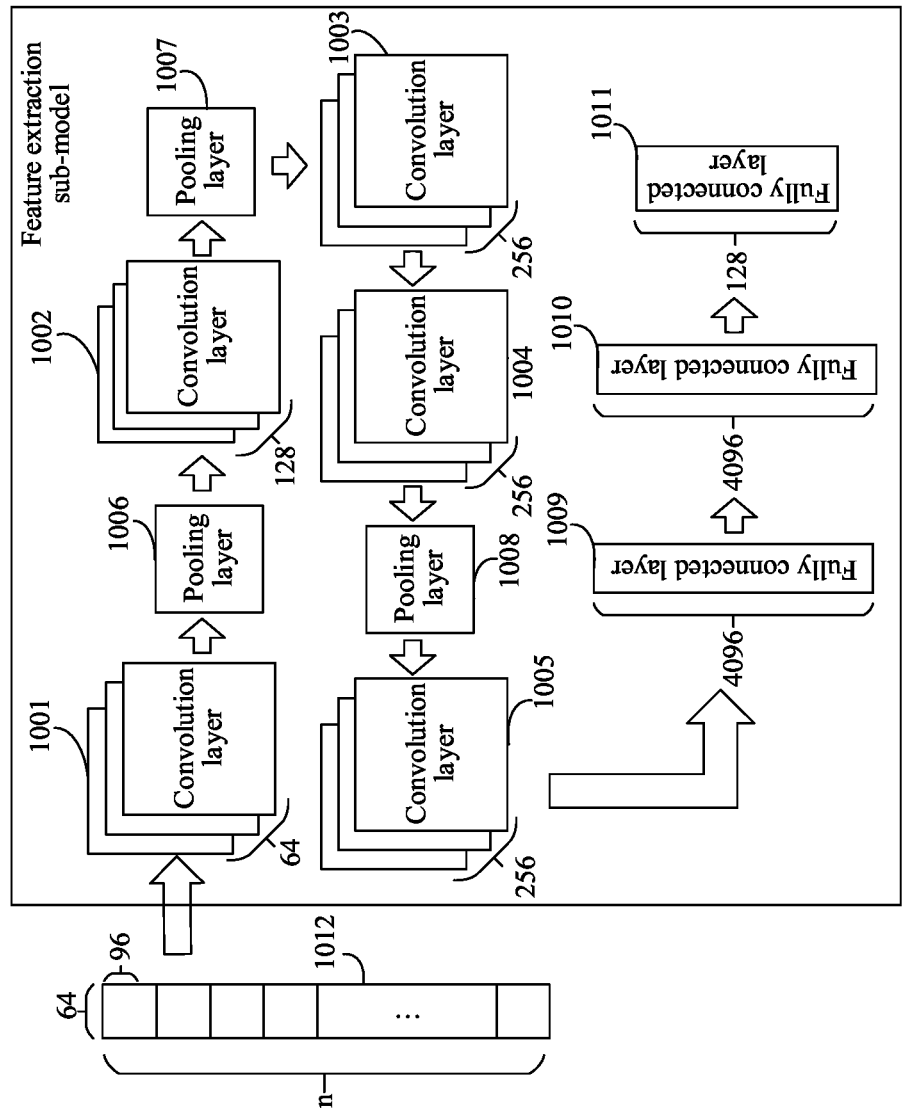
FIG. 10 is a schematic structural diagram of a feature extraction sub-model according to an embodiment of this application.

FIG. 10 is a schematic structural diagram of the feature extraction sub-model according to an embodiment of this application. As shown in FIG. 10, the feature extraction sub-model includes a convolution layer 1001 to a convolution layer 1005, a pooling layer 1006 to a pooling layer 1008, and a fully connected layer 1009 to a fully connected layer 1011. The pooling layer 1006 is connected between the convolution layer 1001 and the convolution layer 1002. The pooling layer 1007 is connected between the convolution layer 1002 and the convolution layer 1003. The pooling layer 1008 is connected between the convolution layer 1004 and the convolution layer 1005. The convolution layer 1005 is connected with the fully connected layer 1009. The fully connected layer 1009 to the fully connected layer 1011 are connected in sequence. A dimension of a convolution kernel of the 5 convolution layers is 3*3, and each convolution layer is obtained by stacking three convolution operations. An input of the feature extraction sub-model is n 96*64 spectral information 1012. An output of the convolution layer 1001 is 64-order information. The output of the convolution layer 1002 is 128-order information. The outputs of the convolution layer 1003 to the convolution layer 1005 are 256-order information. The outputs of the fully connected layer 1009 and the fully connected layer 1010 are 4096-order information, and the output of the fully connected layer 1011 is 128-order information. The convolution layer is configured to learn frequency-domain characteristics of the audio frame. The fully connected layer is configured to reduce the dimension of the multi-dimension feature matrix to a one-dimension feature vector. The pooling layer in FIG. 10 is a maximum pooling layer or a mean pooling layer, and the like.

Figure 11:
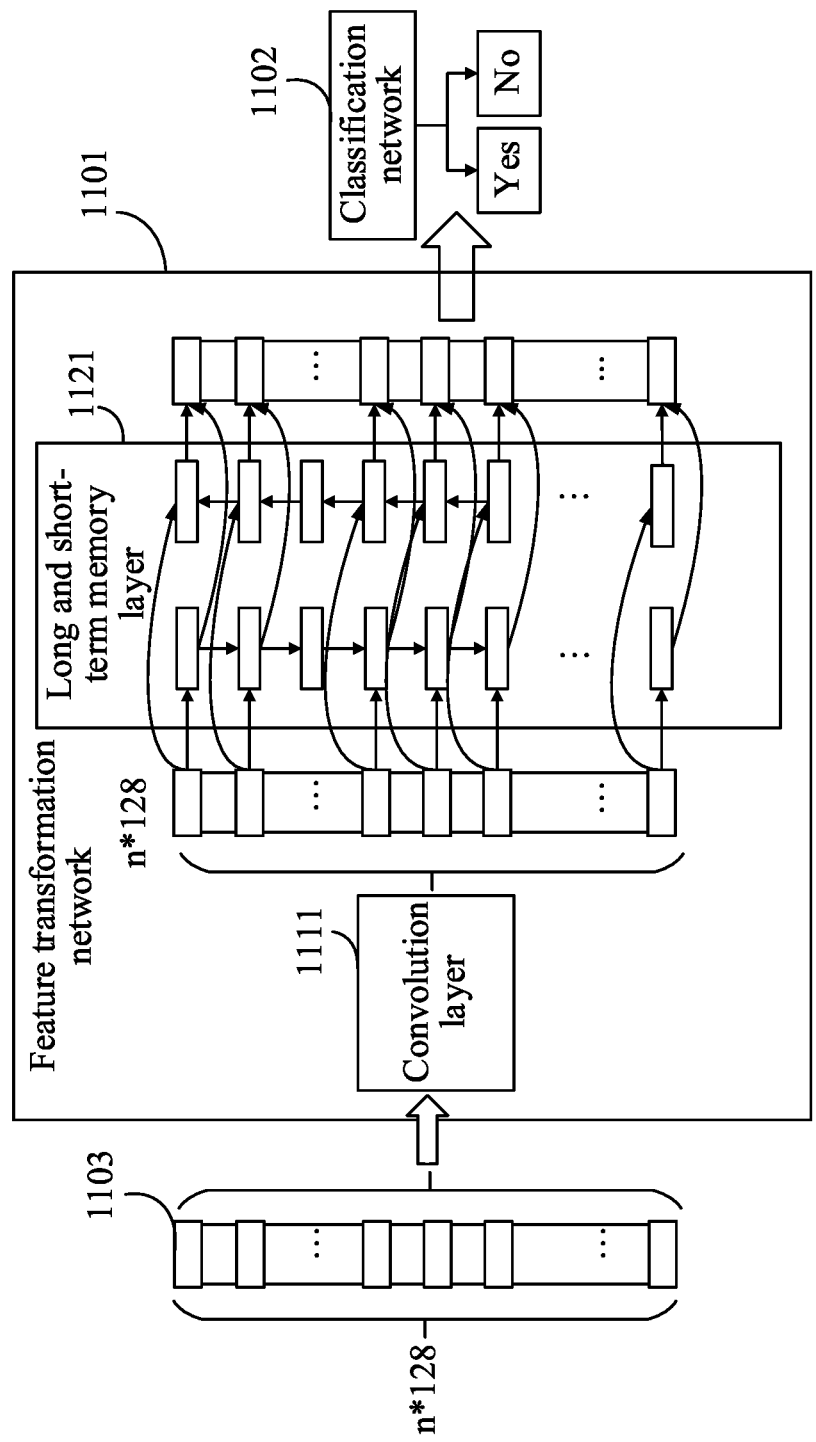
FIG. 11 is a schematic structural diagram of a feature recognition sub-model according to an embodiment of this application.

FIG. 11 is a schematic structural diagram of a feature recognition sub-model according to an embodiment of this application. As shown in FIG. 11, the feature recognition sub-model includes a feature transformation network 1101 and a classification network 1102. The feature transformation network 1101 is connected with the classification network 1102. The feature transformation network 1101 is configured to perform feature transformation on the audio feature to obtain an associated feature. The classification network 1102 is configured to perform classification based on the associated feature. The input of the feature recognition sub-model is n 128-order audio features 1103. The output of the feature recognition sub-model is the recognition result of each audio frame. The recognition result is used for indicating whether the audio frame belongs to the music audio frame. The feature transformation network 1101 includes a convolution layer 1111 and a long short-term memory (LSTM) layer 1121. The convolution layer 1111 is a one-dimension convolution layer. The convolution layer 1111 is configured to integrate high-frequency information and low-frequency information. The LSTM layer 1121 is configured to integrate long-term and short-term information.

Figure 12:
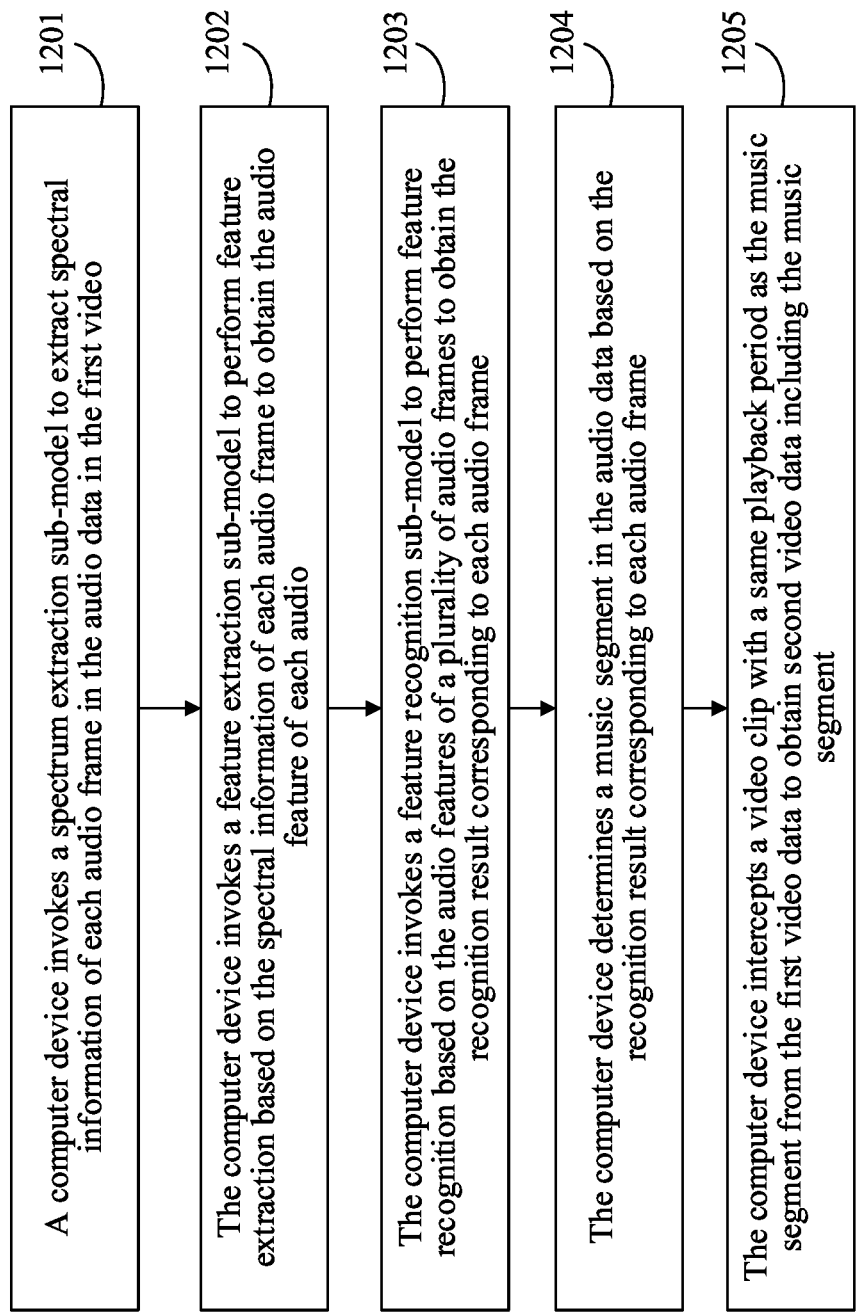
FIG. 12 is a flowchart of another video editing method according to an embodiment of this application.

FIG. 12 is a flowchart of another video editing method according to an embodiment of this application. An execution entity of the embodiments of this application is a computer device. The computer device is a terminal or a server shown in FIG. 1. The computer device invokes the music recognition model to recognize the music audio frame in the audio data. Referring to FIG. 12, the method includes the following steps:

1201: The computer device invokes the spectrum extraction sub-model to extract spectral information of each audio frame in the audio data in the first video data.

The computer device inputs the audio data in the first video data into the spectrum extraction sub-model, and the spectrum extraction sub-model performs spectrum extraction on the audio data, and outputs the spectral information of each audio frame in the audio data.

In some embodiments, the spectrum extraction sub-model includes a frequency-domain transformation network and a filter network. The computer device invokes the frequency-domain transformation network to perform frequency-domain transformation on each audio frame to obtain energy spectrum information of each audio frame, and invokes the filter network to filter the energy spectrum information of each audio frame to obtain the spectral information of each audio frame. In some embodiments, the frequency-domain transformation network includes operating units for framing, windowing and Fourier transformation.

The spectrum extraction sub-model extracts the spectral information in a same manner as step 401, which is not described in detail herein.

1202: The computer device invokes the feature extraction sub-model to perform feature extraction based on the spectral information of each audio frame to obtain the audio feature of each audio frame.

After acquiring the spectral information of each audio frame, the computer device inputs the spectral information of each audio frame into the feature extraction sub-model, and the feature extraction sub-model performs the feature extraction on the spectral information of each audio frame, and outputs the audio feature of each audio frame.

In some embodiments, a network structure of the feature extraction sub-model is shown in FIG. 10. The spectral information of each audio frame is processed according to a connection sequence of all network layers in FIG. 10, and the last fully connected layer in the feature extraction sub-model outputs the audio feature of the audio frame.

The feature extraction sub-model extracts the audio feature in a same manner as step 402, which is not described in detail herein.

1203: The computer device invokes the feature recognition sub-model to perform feature recognition based on the audio features of a plurality of audio frames to obtain the recognition result corresponding to each audio frame.

After obtaining the audio feature of each audio frame, the computer device inputs the audio features of a plurality of audio frames into the feature recognition sub-model, and the feature recognition sub-model performs the feature recognition on the audio frame based on the audio features of the plurality of audio frames, and outputs the recognition result of each audio frame. In some embodiments, the recognition result is a feature vector. The feature vector includes a classification numerical value of each audio frame. The classification numerical value indicates the possibility that the audio frame belongs to the music audio frame. In the embodiments of this application, the input of the feature extraction sub-model is frame-scale spectral information. Therefore, a feature granularity of the spectral information is of a millisecond scale, so that the granularity of music recognition is positioned at the millisecond scale, which improves the accuracy of music recognition.

In some embodiments, the network structure of the feature recognition sub-model is shown in FIG. 11. The feature recognition sub-model includes a feature transformation network and a classification network. The computer device invokes the feature transformation network, and performs the feature transformation based on the audio features of a plurality of audio frames to obtain an associated feature of each audio frame. The associated feature of the audio frame indicates an association relationship between the audio frame and preceding audio frames and follow-up audio frames. The computer device invokes the classification network to perform classification based on the associated feature of each audio frame to obtain the recognition result of each audio frame.

The feature recognition sub-model recognizes the audio frame in a same manner as step 403, which is not described in detail herein.

1204: The computer device determines the music segment in the audio data based on the recognition result corresponding to each audio frame.

Step 1204 is similar to step 404 to step 406, and is not described in detail herein.

1205: The computer device intercepts the video clip with the same playback period as the music segment from the first video data to obtain second video data including the music segment.

Step 1205 is similar to step 407, and is not described in detail herein.

According to the technical solution provided by the embodiments of this application, the music segment in the audio data is determined by invoking the music recognition model to perform music recognition on the audio data in the video data, and the video clip including the music in the video data is located automatically based on an appearance position of the music segment in the video data so as to intercept the video clip including the music from the video data. An editing method for automatically recognizing the music segment and locating the video clip based on the music segment is provided, which realizes the automatic process of video editing without manually marking and editing the video data, thereby reducing the time cost and labor cost of the video editing, and improving the editing efficiency.

Moreover, the music audio frame in the audio data is recognized by invoking the music recognition model, which simplifies the process of music recognition, and improves the convenience in music recognition for the audio data.

Moreover, the input of the feature extraction sub-model is frame-scale spectral information. Therefore, the feature granularity of the spectral information is of a millisecond scale, so that the granularity of the music recognition is located at the millisecond scale, and the accuracy of music recognition is improved.

Figure 13:
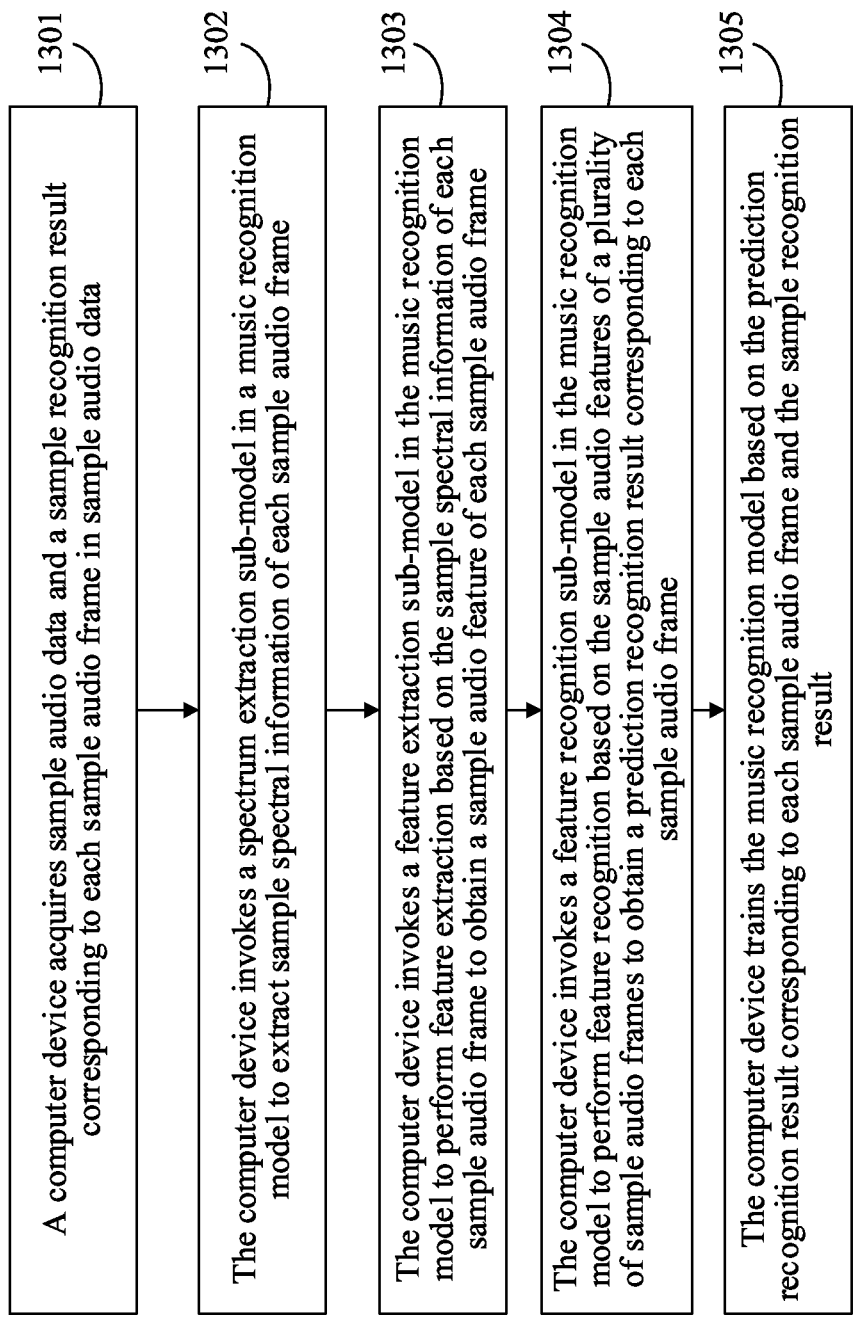
FIG. 13 is a flowchart of a training method of a music recognition model according to an embodiment of this application.

FIG. 13 is a flowchart of a training method of a music recognition model according to an embodiment of this application. An execution entity of the embodiments of this application is a computer device. The music recognition model trained in the embodiments may be applied to the embodiment of FIG. 12 as described above. Referring to FIG. 13, the method includes the following steps:

1301: The computer device acquires sample audio data and a sample recognition result corresponding to each sample audio frame in the sample audio data.

In order to train the music recognition model, the computer device first acquires the sample audio data and the sample recognition result of each sample audio frame in the sample audio data. The sample recognition result indicates whether the sample audio frame belongs to the music audio frame. For example, the computer device takes the audio data belonging to the music as the sample audio data, and each sample recognition result indicates that the sample audio frame belongs to the music audio frame. The computer device takes the audio data not belonging to the music as the sample audio data, and each sample recognition result indicates that the sample audio frame belongs to the non-music audio frame. In some embodiments, the computer device acquires the sample audio data from an Audioset or extracts the audio data from the video data stored in a local database as the sample audio data.

It is to be noted that, a process of training the music recognition model based on the sample audio data and the sample recognition result includes multiple iterations. During each iteration, the training is performed based on a piece of sample audio data and the sample recognition result of the sample audio data. In the embodiments of this application, only one iteration is taken as an example for description in step 1301 to step 1305.

1302: The computer device invokes the spectrum extraction sub-model in the music recognition model to extract sample spectral information of each sample audio frame.

1303: The computer device invokes the feature extraction sub-model in the music recognition model to perform feature extraction based on the sample spectral information of each sample audio frame to obtain a sample audio feature of each sample audio frame.

1304: The computer device invokes the feature recognition sub-model in the music recognition model to perform feature recognition based on the sample audio features of a plurality of sample audio frames to obtain a prediction recognition result corresponding to each sample audio frame.

Step 1302 to step 1304 are similar to step 1201 to step 1203, which are not described in detail herein.

1305: The computer device trains the music recognition model based on the prediction recognition result corresponding to each sample audio frame and the sample recognition result.

The sample recognition result of the sample audio frame is a real recognition result. The prediction recognition result acquired by the computer device is a recognition result predicted by the music recognition model. The more similar the prediction recognition result is to the real sample recognition result, the more accurate the music recognition model is. Therefore, the computer device trains the music recognition model based on a difference between the prediction recognition result and the real sample recognition result so as to improve the recognition capacity of the music recognition model, thereby improving the accuracy of the music recognition model.

In some embodiments, the computer device repeats step 1301 to step 1305 to perform iterative training on the music recognition model, and stops training the music recognition model when the number of iterations reaches a first threshold; or, the training on the music recognition model is stopped when a loss value obtained by the current iteration is not greater than a second threshold. Both the first threshold and the second threshold are any numerical value, for example, the first threshold is 1000 or 1500, and the like, and the second threshold is 0.004 or 0.003, and the like.

According to the technical solution provided by the embodiments of this application, the music recognition model is trained by using the sample audio data and the sample recognition result of the sample audio data, so that the music recognition model has capacity of recognizing the music audio frame in the audio data, thereby providing a method for automatically recognizing the music audio frame.

Figure 14:
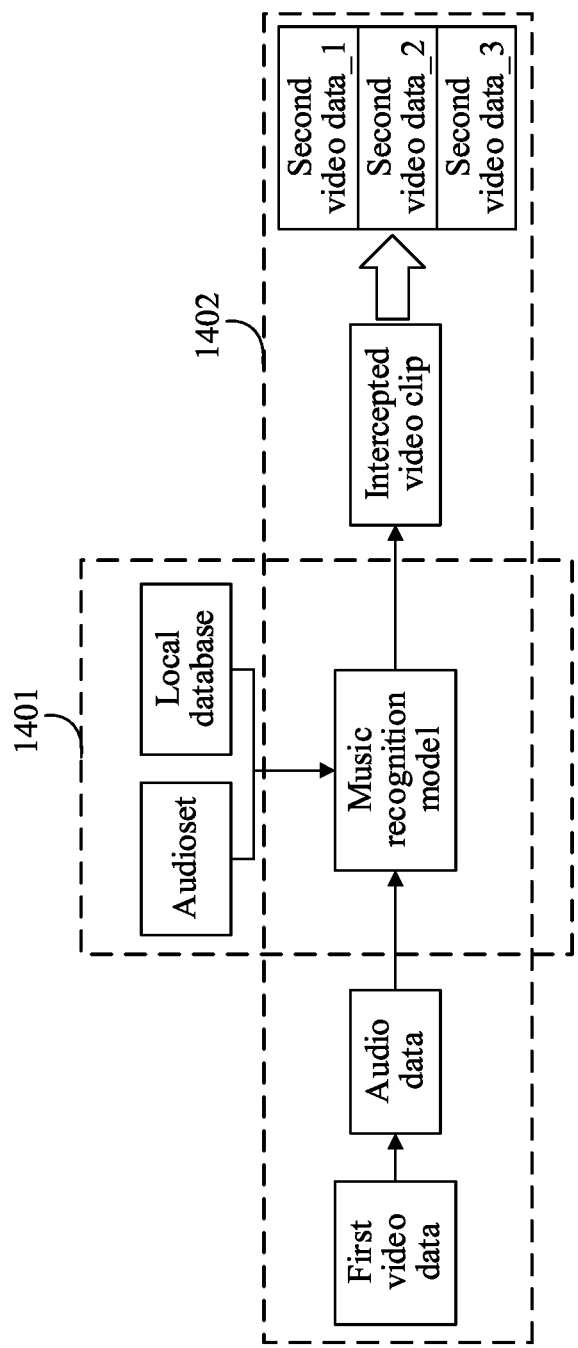
FIG. 14 is a schematic diagram of a video editing method according to an embodiment of this application.

A video editing method provided by the embodiments of this application includes two phases: a training phase of the music recognition model and an intercepting phase of the video clips based on the music recognition model. FIG. 14 is a schematic diagram of a video editing method according to an embodiment of this application. As shown in FIG. 14, the video editing method includes a training phase 1401 of the music recognition model and a video intercepting phase 1402. At the training phase 1401 of the music recognition model, the computer device acquires the sample audio data from the Audioset and the local database, and trains the music recognition model based on the sample audio data. At the video intercepting phase 1402, the computer device extracts the audio data in the first video data, invokes the music recognition model to perform music recognition on the audio data to obtain a plurality of music segments in the audio data, and intercepts video clips with the same playback period as each music segment from the video data to obtain a plurality of fantastic second video data collections. In FIG. 14, obtaining the second video data_1, the second video data_2 and the second video data_3 is taken as an example for description.

Figure 15:
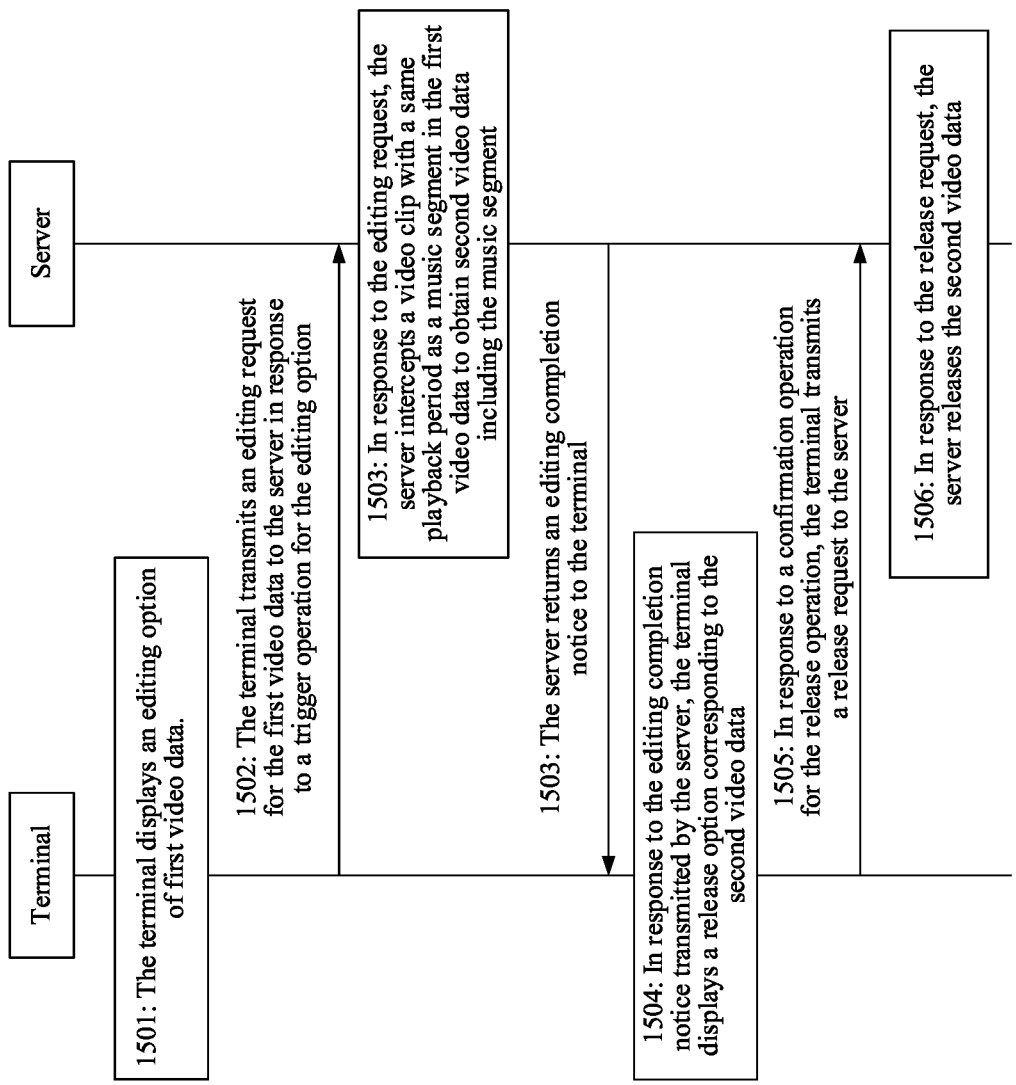
FIG. 15 is a flowchart of a video editing method according to an embodiment of this application.

In some embodiments, the first video data is edited to obtain the second video data including the music segment, and then the second video data is released for more accounts to watch. FIG. 15 is a flowchart of a video editing method according to an embodiment of this application. Interaction entities of the embodiments of this application are a terminal and a server. Referring to FIG. 15, the method includes:

1501: The terminal displays an editing option of the first video data.

The first video data is to-be-edited video data. The editing option of the first video data is used for editing the first video data.

1502: The terminal transmits an editing request for the first video data to the server in response to a trigger operation for the editing option.

When the management personnel of the video data wants to edit the first video data, the trigger operation for the editing option is performed. In response to the trigger operation for the editing option, the terminal generates the editing request for the first video data, and transmits the editing request to the server. The editing request is used for requesting the server to edit the first video data.

1503: In response to the editing request, the server intercepts the video clip with the same playback period as the music segment in the first video data to obtain the second video data including the music segment, and returns an editing completion notice to the terminal.

In response to the editing request for the first video data, the server determines the music segment in the first video data, intercepts the video clip with the same playback period as the music segment from the first video data to obtain the second video data including the music segment, and transmits the editing completion notice to the terminal. The editing completion notice is used for notifying that the editing of the first video data is completed.

In some embodiments, the editing request carries a video identification of the first video data. The video identification indicates the first video data. The server acquires the video identification carried in the editing request, searches the first video data indicated by the video identification from a video database, and edits the first video data.

In some embodiments, the server adopts the video editing method provided by the embodiments of FIG. 2, FIG. 4 or FIG. 12 to intercept the video clip including the music segment from the first video data. The video clip is determined as the second video data.

1504: In response to the editing completion notice transmitted by the server, the terminal displays a release option corresponding to the second video data.

In response to the editing completion notice, the terminal displays the release option of the second video data. The release option is used for releasing the second video data.

In some embodiments, the editing completion notice carries the second video data. In response to the editing completion notice transmitted by the server, the terminal acquires the second video data carried by the editing completion notice, and displays the second video data, so that the management personnel of the video data checks the second video data that is edited automatically. Since the second video data is edited automatically by the server, by displaying the second video data, the second video data is checked by the management personnel. In a case where the second video data has no problem, the second video data is directly released subsequently. In a case where the second video data has a problem, the management personnel manually edits the second video data to ensure the quality of the second video data.

In some embodiments, the server edits the first video data to obtain a plurality of pieces of second video data. The editing completion notice includes the video identification of the second video data. In response to the editing completion notice, the terminal displays the release option of each second video data.

Figure 16:
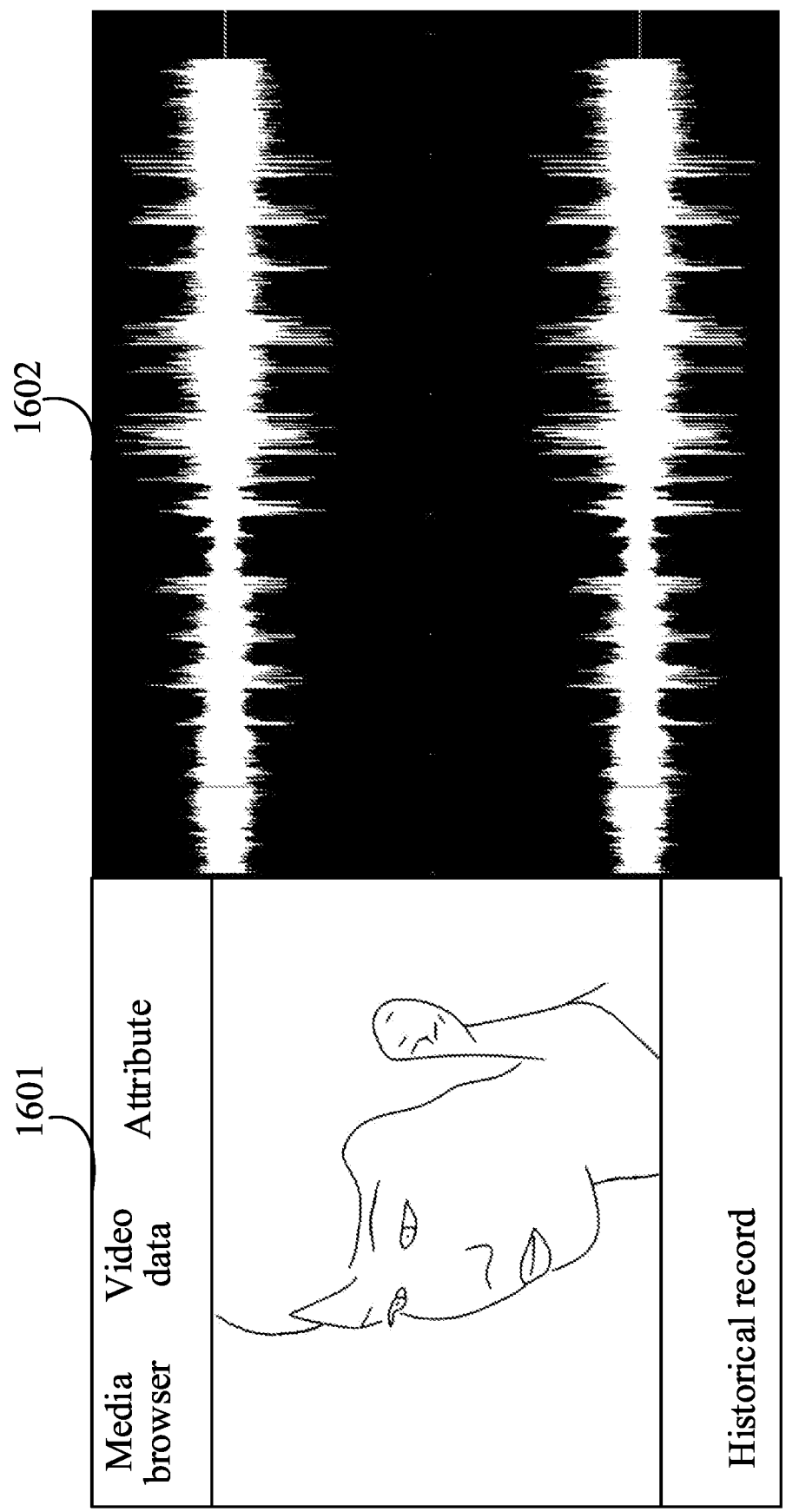
FIG. 16 is a schematic diagram of a video management interface according to an embodiment of this application.

FIG. 16 is a schematic diagram of a video management interface according to an embodiment of this application. As shown in FIG. 16, the terminal displays the video management interface. The video management interface includes a video display sub-interface 1601 and an audio display sub-interface 1602. The video display sub-interface 1601 includes the intercepted second video data. The audio display sub-interface 1602 includes an audio track of the audio data in the second video data. The audio data is the BGM in the second video data.

1505: In response to a confirmation operation for the release operation, the terminal transmits a release request to the server.

When the management personnel of the video data wants to release the second video data, the confirmation operation for the release option is performed on the terminal. The confirmation operation includes a click operation, a sliding operation or a drag operation, and the like. In response to the confirmation operation for the release option, the terminal generates the release request for the second video data, and transmits the release request to the server. The release request is used for requesting the server to release the second video data.

1506: In response to the release request, the server releases the second video data.

In some embodiments, the release request carries the video identification of the second video data. The server searches the second video data indicated by the video identification, and releases the second video data.

In another embodiment, the terminal runs a video playback client and a video management client. The video playback client and the video management client both are served by the server. The video management client is configured to manage the video data released in the video playback client. For example, the video data is released, deleted or modified by the video management client in the video playback client.

The terminal displays the editing option of the first video data in the video management client, and transmits the editing request for the first video data to the server through the video management client in response to the trigger operation for the editing option, in response to the editing request, the server intercepts the music segment in the first video data to obtain the second video data, and returns the editing completion notice to the video management client. In response to the editing completion notice, the terminal displays the release option of the second video data in the video management client, and transmits the release request to the server through the video management client in response to the confirmation operation for the release option. In response to the release request, the server releases the second video data in the video playback client. The server releases the second video data in the video playback client, which refers to that the server transmits the second video data to the terminal with the video playback client, so that the terminal can play the second video data in the video playback client, and more accounts can watch the second video data.

According to the technical solution provided by the embodiments of this application, only by performing the trigger operation for the editing option of the first video data, the second video data including the music segment is automatically intercepted from the first video data without manually performing a complicated editing operation, thereby improving the video editing efficiency. Moreover, since the automatically edited second video data includes the music segment, the information density carried by the second video data is higher. To release the second video data is conducive to increasing the hits of the video data.

Figure 17:
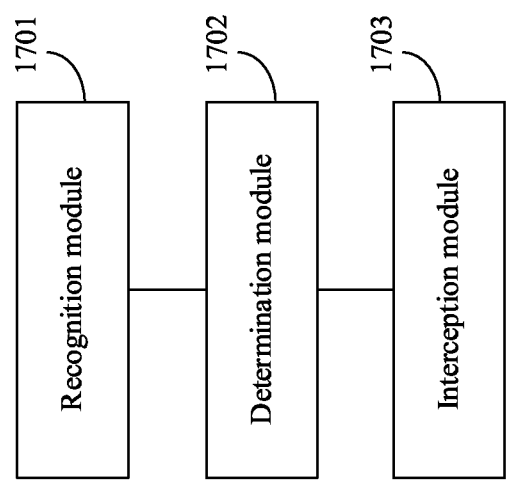
FIG. 17 is a schematic structural diagram of a video editing apparatus according to an embodiment of this application.

FIG. 17 is a schematic structural diagram of a video editing apparatus according to an embodiment of this application; referring to FIG. 17, the apparatus includes:
- a recognition module 1701, configured to perform music recognition on audio data in first video data to obtain a recognition result of each audio frame in the audio data, the recognition result indicating whether the audio frame belongs to a music audio frame;
- a determination module 1702, configured to determine a music segment in the audio data based on the recognition result of each audio frame, the music segment including a plurality of music audio frames; and
- an interception module 1703, configured to intercept a video clip with a same playback period as the music segment from the first video data to obtain second video data including the music segment.

According to the technical solution provided by the embodiments of this application, the music segment in the audio data is determined by performing music recognition on the audio data in the video data, and the video clip including the music in the video data is located automatically based on an appearance position of the music segment in the video data, so that the video clip including the music is intercepted from the video data, which realizes the automatic process of the video editing without editing the video manually, and improves the video editing efficiency.

Figure 18:
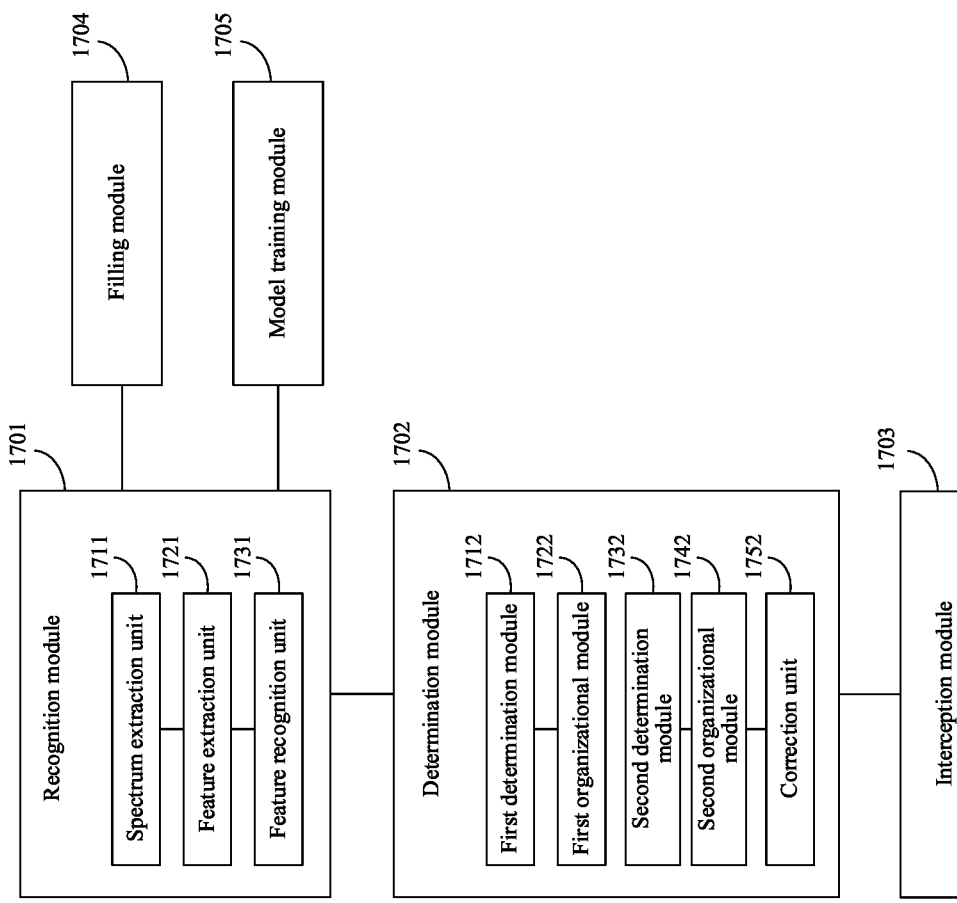
FIG. 18 is a schematic structural diagram of another video editing apparatus according to an embodiment of this application.

In some embodiments, referring to FIG. 18, the recognition module 1701 includes: a spectrum extraction unit 1711, configured to extract spectral information of each audio frame; a feature extraction unit 1721, configured to perform feature extraction respectively based on the spectral information of each audio frame to obtain an audio feature of each audio frame; a feature recognition unit 1731, configured to perform feature recognition based on the audio features of a plurality of audio frames to obtain a recognition result of each audio frame.

In some embodiments, referring to FIG. 18, the spectrum extraction unit 1711 is configured to: perform frequency-domain transformation on each audio frame to obtain energy spectrum information of each audio frame; and filter the energy spectrum information of each audio frame to obtain the spectral information of each audio frame.

In some embodiments, referring to FIG. 18, the feature extraction unit 1721 is configured to: organize a first number of preceding audio frames of the first audio frame, a first audio frame and a second number of follow-up audio frames of the first audio frame into a frame set, the preceding audio frames being audio frames located before the first audio frame, the follow-up audio frames being audio frames located after the first audio frame; and perform feature extraction on the spectral information of a plurality of audio frames in the frame set, and determine the extracted audio feature as the audio feature of the first audio frame, where the first audio frame is any audio frame in the audio data.

In some embodiments, referring to FIG. 18, the apparatus further includes: a filling module 1704, configured to fill at least one audio frame before the first audio frame to make the number of preceding audio frames of the first audio frame equal to the first number when the number of preceding audio frames of the first audio frame is less than the first number; a filling module 1704, further configured to fill at least one audio frame after the first audio frame to make the number of follow-up audio frames of the first audio frame equal to the second number when the number of follow-up audio frames of the first audio frame is less than the second number.

In some embodiments, referring to FIG. 18, the feature recognition unit 1731 is configured to: perform feature transformation based on the audio features of a plurality of audio frames to obtain an associated feature of each audio frame, the associated feature of the audio frame indicating an association relationship between the audio frame and the preceding audio frames and the follow-up audio frames; and perform classification based on the associated feature of each audio frame to obtain the recognition result of each audio frame.

In some embodiments, referring to FIG. 18, the recognition module 1701 is configured to: invoke a music recognition model to perform music recognition on the audio data in the first audio data to obtain the recognition result of each audio frame in the audio data.

In some embodiments, referring to FIG. 18, the music recognition model includes a spectrum extraction sub-model, a feature extraction sub-model and a feature recognition sub-model. The recognition module 1701 includes: a spectrum extraction unit 1711, configured to invoke the spectrum extraction sub-model to extract spectral information of each audio frame; a feature extraction unit 1721, configured to invoke the feature extraction sub-model to perform feature extraction respectively based on the spectral information of each audio frame to obtain the audio feature of each audio frame; and a feature recognition unit 1731, configured to invoke the feature recognition sub-model to perform feature recognition based on the audio features of a plurality of audio frames to obtain the recognition result of each audio frame.

In some embodiments, referring to FIG. 18, the feature recognition sub-model includes a feature transformation network and a classification network. The feature recognition unit 1731 is configured to: invoke the feature transformation network to perform feature transformation based on the audio features of a plurality of audio frames to obtain an associated feature of each audio frame, the associated feature of the audio frame indicating an association relationship between the audio frame and the preceding audio frames and the follow-up audio frames; and invoke the classification network to perform classification based on the associated feature of each audio frame to obtain the recognition result of each audio frame.

In some embodiments, referring to FIG. 18, the apparatus further includes a model training module 1705, configured to: acquire sample audio data and a sample recognition result of each sample audio frame in the sample audio data, the sample recognition result indicating whether the sample audio frame belongs to the music audio frame; invoke the spectrum extraction sub-model to extract sample spectral information of each sample audio frame; invoke the feature extraction sub-model to perform feature extraction based on the sample spectral information of each sample audio frame to obtain a sample audio feature of each sample audio frame; invoke the feature recognition sub-model to perform feature recognition based on the sample audio features of a plurality of sample audio frames to obtain a prediction recognition result of each sample audio frame; and train the music recognition model based on the prediction recognition result of each sample audio frame and the sample recognition result.

In some embodiments, referring to FIG. 18, the recognition result of the audio frame is a classification numerical value, and the classification numerical value indicates the possibility that the audio frame belongs to the music audio frame; the determination module 1702 includes: a first determination unit 1712, configured to determine the audio frame as a music audio frame when the classification numerical value of the audio frame is greater than a classification threshold; and a first organizational unit 1722, configured to organize a plurality of consecutive music audio frames in the audio data into a music segment.

In some embodiments, referring to FIG. 18, the determination module 1702 includes: a second determination unit 1732, configured to determine a music audio frame and a non-music audio frame in the audio data based on the recognition result of each audio frame; a second organizational unit 1742, configured to organize a plurality of consecutive music audio frames in the audio data into a music segment, and combine a plurality of consecutive non-music audio frames into a non-music segment; a correction unit 1752, configured to correct the music segment and non-music segment in the audio data according to at least one of playback information of the music segment or playback information of the non-music segment.

In some embodiments, referring to FIG. 18, the playback information includes a playback duration. The correction unit 1752 is configured to combine a first music segment, a second music segment and a first non-music segment into a music segment when there is the first non-music segment between the first music segment and the second music segment and the playback duration of the first non-music segment is less than a first duration.

In some embodiments, referring to FIG. 18, the playback information includes the playback duration. The correction unit 1752 is configured to combine a second non-music segment, a third non-music segment and a third music segment into a non-music segment when there is the third music segment between the second non-music segment and the third non-music segment, and the playback duration of the third music segment is less than a second duration.

In some embodiments, referring to FIG. 18, the playback information includes the playback duration. The correction unit 1752 is configured to correct a fourth music segment to be a non-music segment when the playback duration of the fourth music segment is less than a third duration.

In some embodiments, referring to FIG. 18, the playback information includes a playback period. The correction unit 1752 is configured to: correct a fifth music segment to be a non-music segment when the playback period of the fifth music segment is within a start period of the audio data; or, correct the fifth music segment to be a non-music segment when the playback period of the fifth music segment is within an end period of the audio data.

Figure 19:
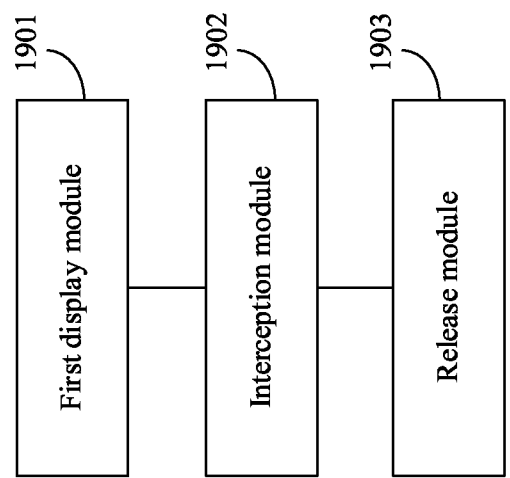
FIG. 19 is a schematic structural diagram of a video editing apparatus according to an embodiment of this application.

FIG. 19 is a schematic structural diagram of a video editing apparatus according to an embodiment of this application. Referring to FIG. 19, the apparatus includes:
- a first display module 1901, configured to display an editing option of first video data;
- an interception module 1902, configured to intercept a video clip with a same playback period as the music segment in response to a trigger operation for the editing option to obtain second video data including the music segment;
- a release module 1903, configured to release the second video data in response to a release operation for the second video data.

According to the technical solution provided by the embodiments of this application, only by performing the trigger operation for the editing option of the first video data, the second video data including the music segment is automatically intercepted from the first video data without manually performing a complicated editing operation, thereby improving the video editing efficiency. Moreover, since the automatically edited second video data includes the music segment, the information density carried by the second video data is higher. To release the second video data is conducive to increasing hits of the video data.

Figure 20:
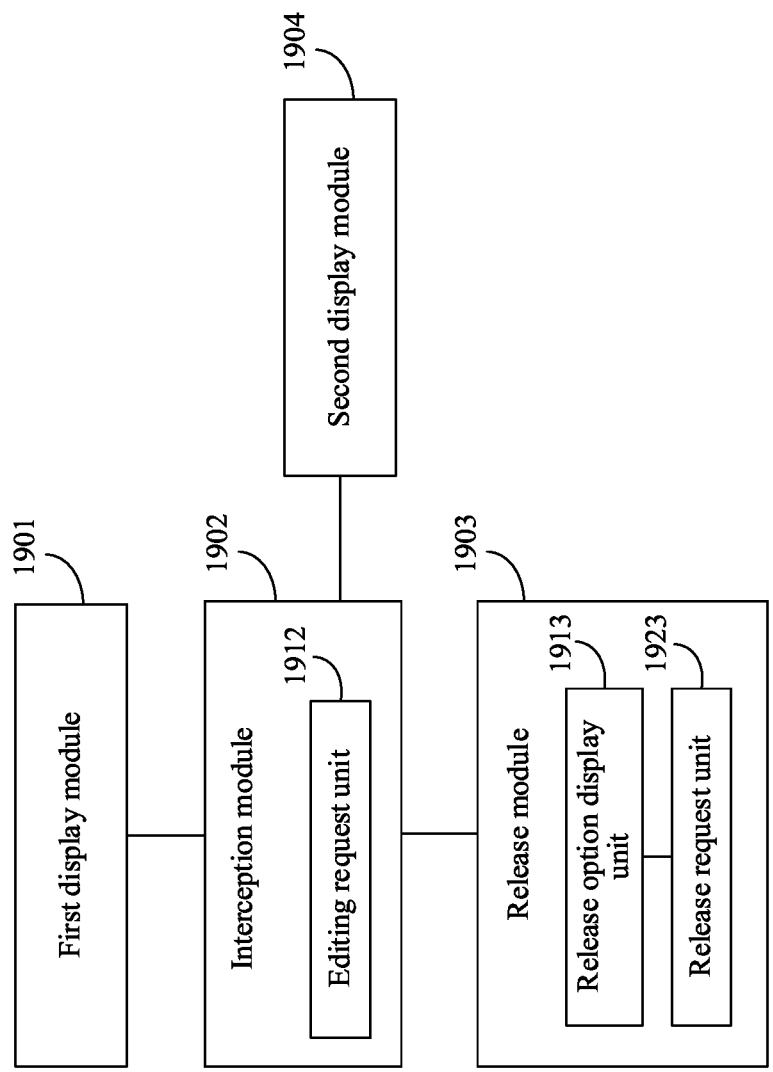
FIG. 20 is a schematic structural diagram of another video editing apparatus according to an embodiment of this application.

In some embodiments, referring to FIG. 20, the interception module 1902 includes: an editing request unit 1912, configured to transmit an editing request for the first video data to the server in response to a trigger operation for the editing option, the server being configured to intercept the video clip with the same playback period as the music segment in the first video data to obtain the second video data, and return an editing completion notice; a release module 1903 includes: a release option display unit 1913, configured to display a release option of the second video data in response to the editing completion notice transmitted by the server; and a release request unit 1923, configured to transmit a release request to the server in response to a confirmation operation for the release option, the server being configured to release the second video data in response to the release request.

In some embodiments, referring to FIG. 20, the editing completion notice carries the second video data, and the apparatus further includes: a second display module 1904, configured to acquire the second video data carried by the editing completion notice in response to the editing completion notice transmitted by the server, and display the second video data.

It is to be noted that, the division of the above functional modules is only taken as an example for description when the video editing apparatus provided by the foregoing embodiments performs the video editing. In actual applications, the functions may be allocated to different functional modules according to the requirements, which means that the internal structure of the computer device is divided to different functional modules to complete all or some of the above functions. In addition, the video editing apparatus provided in the foregoing embodiments and the video editing method embodiments fall within a same conception. For details of a specific implementation process, refer to the method embodiments. Details are not described herein.

An embodiment of this application also provides a computer device. The computer device includes a processor and a memory, the memory storing at least one computer program, and the at least one computer program being loaded and executed by the processor to implement the video editing method of the above embodiments.

Figure 21:
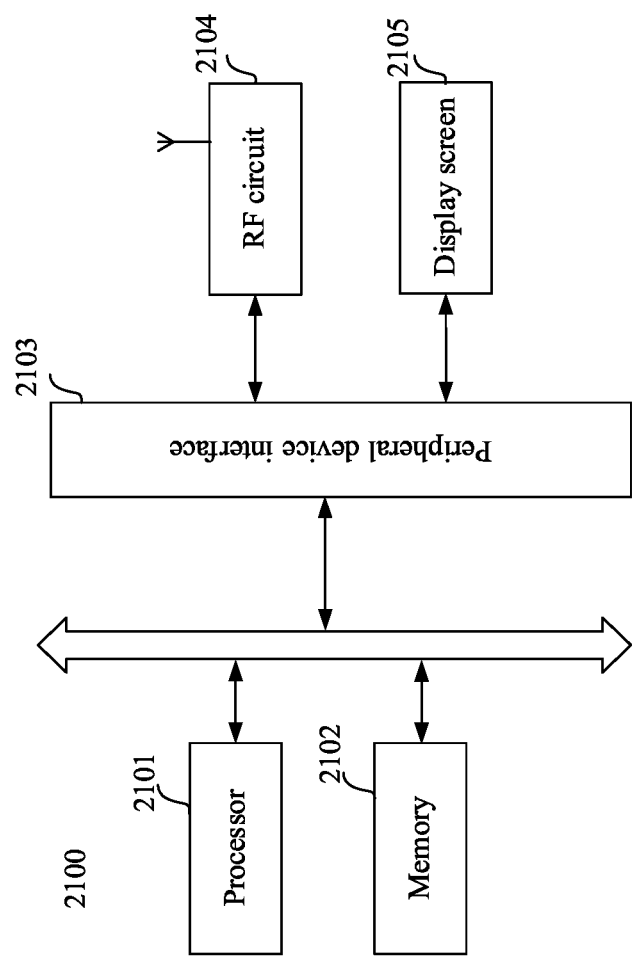
FIG. 21 is a schematic structural diagram of a terminal 2100 according to an exemplary embodiment of this application.

In some embodiments, the computer device is provided as a terminal. FIG. 21 is a schematic structural diagram of a terminal 2100 according to an exemplary embodiment of this application. The terminal 2100 includes: a processor 2101 and a memory 2102.

The processor 2101 includes one or more processing cores, such as a 4-core processor or an 8-core processor. The processor 2101 is implemented by at least one hardware form of a digital signal processor (DSP), a field-programmable gate array (FPGA), and a programmable logic array (PLA). The processor 2101 further includes a main processor and a co-processor. The main processor is a processor configured to process data in an awake state, and is also referred to as a central processing unit (CPU). The co-processor is a low power consumption processor configured to process the data in a standby state. In some embodiments, the processor 2101 is integrated with a graphics processing unit (GPU). The GPU is configured to render and draw content that needs to be displayed on a display screen. In some embodiments, the processor 2101 further includes an artificial intelligence (AI) processor. The AI processor is configured to process computing operations related to machine learning.

The memory 2102 includes one or more computer-readable storage media. The computer-readable storage medium is non-transient. The memory 2102 further includes a high-speed random access memory and a nonvolatile memory, such as one or more disk storage devices or flash storage devices. In some embodiments, the non-transitory computer-readable storage medium in the memory 2102 is configured to store at least one computer program. The at least one computer program is executed by the processor 2101 to implement the video editing method provided in the method embodiments of this application.

In some embodiments, the terminal 2100 further optionally includes: a peripheral device interface 2103 and at least one peripheral device. The processor 2101, the memory 2102, and the peripheral device interface 2103 are connected through a bus or a signal cable. Each peripheral device is connected to the peripheral device interface 2103 through a bus, a signal cable, or a circuit board. In some embodiments, the peripheral device includes: at least one of a radio frequency (RF) circuit 2104 and a display screen 2105.

The peripheral device interface 2103 may be configured to connect the at least one peripheral device related to input/output (I/O) to the processor 2101 and the memory 2102. In some embodiments, the processor 2101, the memory 2102 and the peripheral device interface 2103 are integrated on a same chip or circuit board. In some other embodiments, any one or two of the processor 2101, the memory 2102 and the peripheral device interface 2103 are implemented on a single chip or circuit board. This is not limited in this embodiment.

The RF circuit 2104 is configured to receive and transmit an RF signal, also referred to as an electromagnetic signal. The RF circuit 2104 communicates with a communication network and other communication devices through the electromagnetic signal. The RF circuit 2104 converts an electric signal into an electromagnetic signal for transmission, or converts a received electromagnetic signal into an electric signal. In some embodiments, the RF circuit 2104 includes: an antenna system, an RF transceiver, one or more amplifiers, a tuner, an oscillator, a digital signal processor, a codec chip set, a subscriber identity module card, and the like. The RF circuit 2104 communicates with other devices by using at least one wireless communication protocol. The wireless communication protocol includes, but is not limited to: a metropolitan area network, generations of mobile communication networks (2G, 3G, 4G, and 5G), a wireless local area network, and/or a wireless fidelity (Wi-Fi) network. In some embodiments, the RF circuit 2104 further includes a circuit related to near field communication (NFC), which is not limited in this application.

The display screen 2105 is configured to display a user interface (UI). The UI includes a graph, text, an icon, a video, and any combination thereof. In a case where the display screen 2105 is a touch display screen, the display screen 2105 further has a capability of acquiring a touch signal on or above a surface of the display screen 2105. The touch signal is inputted to the processor 2101 as a control signal for processing. In this case, the display screen 2105 is further configured to provide a virtual button and/or a virtual keyboard that are/is also referred to as a soft button and/or a soft keyboard. In some embodiments, one display screen 2105 is arranged at a front panel of the terminal 2100. In some other embodiments, two display screens 2105 are respectively arranged on different surfaces of the terminal 2100 or are in a folding design. In some other embodiments, one display screen 2105 is a flexible display screen, and is arranged on a curved surface or a folded surface of the terminal 2100. Even, the display screen 2105 is further set in a non-rectangular irregular pattern, namely, a special-shaped screen. The display screen 2105 is prepared by using materials such as a liquid crystal display (LCD), an organic light-emitting diode (OLED), or the like.

A person skilled in the art may understand that the structure shown in FIG. 21 constitutes no limitation to the terminal 2100, and the terminal may include more or fewer components than those shown in the figure, or some components may be combined, or a different component deployment may be used.

Figure 22:
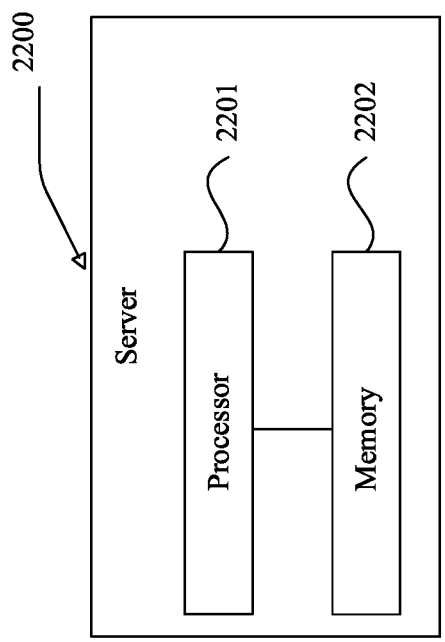
FIG. 22 is a schematic structural diagram of a server according to an embodiment of this application.

In some embodiments, the computer device is a server. FIG. 22 is a schematic structural diagram of a server according to an embodiment of this application. The server 2200 may vary a lot due to different configurations or performance, and may include one or more central processing units (CPUs) 2201 and one or more memories 2202. The memory 2202 stores at least one computer program. The at least one computer program is loaded and executed by the CPU 2201 to implement the video editing method provided in the foregoing method embodiments. Certainly, the server is further provided with components such as a wired or wireless network interface, a keyboard, and an input/output (I/O) interface, to facilitate input and output. The server further includes another component configured to implement a function of a device. Details are not further described herein.

An embodiment of this application further provides a computer-readable storage medium. The computer-readable storage medium stores at least one computer program. The at least one computer program is loaded and executed by a processor to implement operations performed in the video editing method according to the foregoing embodiments.

An embodiment of this application also provides a computer program product or a computer program. The computer program product or the computer program includes a computer program code, the computer program code being stored in a computer-readable storage medium, a processor of a computer device reading the computer program code from the computer-readable storage medium, the processor executing the computer program code to make the computer device implement operations performed in the video editing method as described above. In some embodiments, the computer program according to the embodiment of this application may be executed by one computer device, or executed by a plurality of computer devices located in a same place, or executed by a plurality of computer devices distributed in a plurality of places and interconnected through a communication network, the plurality of computer devices distributed in a plurality of places and interconnected through the communication network constituting a block-chain system.

An ordinary skilled in the art may understand that all or some of the steps of the foregoing embodiments are implemented by hardware, or implemented by a program instructing relevant hardware. The program is stored in a computer-readable storage medium. The storage medium is a read-only memory, a magnetic disk, an optical disc, or the like.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules. Moreover, each module or unit can be part of an overall module that includes the functionalities of the module or unit. The foregoing descriptions are merely optional embodiments of the embodiments of this application, but are not intended to limit the embodiments of this application. Any modification, equivalent replacement, or improvement made within the spirit and principle of the embodiments of this application shall fall within the protection scope of the embodiments of this application.

What is claimed is:

1. A video editing method performed by a computer device, the method comprising:

performing music recognition on audio data in first video data using a music recognition model to obtain a recognition result of each of audio frames in the audio data, the recognition result indicating whether the audio frame belongs to a music audio frame;

determining a music segment in the audio data based on the recognition results of the audio frames, further comprising:

determining a first plurality of consecutive music audio frame followed by a second plurality of consecutive non-music audio frame in the audio data based on the recognition result of each of the audio frames;

organizing the first plurality of consecutive music audio frames in the audio data into the music segment;

organizing the second plurality of consecutive non-music audio frames into a non-music segment; and correcting the music segment in the audio data based on at least one of playback information of the music segment and playback information of the non-music segment; and extracting, from the first video data, a video clip with a same playback period as the music segment as second video data comprising the music segment.

2. The method according to claim 1, wherein the performing music recognition on audio data in first video data to obtain a recognition result of each of audio frames in the audio data comprises:

extracting spectral information from each of the audio frames;

performing feature extraction respectively based on the spectral information of each of the audio frames to obtain an audio feature of each of the audio frames; and performing feature recognition based on the audio features of the audio frames to obtain the recognition result of each of the audio frames.

3. The method according to claim 2, wherein the extracting spectral information from each of the audio frames comprises:

performing frequency-domain transformation on each of the audio frames to obtain energy spectrum information of each of the audio frames; and filtering the energy spectrum information of each of the audio frames to obtain the spectral information of each of the audio frames.

4. The method according to claim 2, wherein the performing feature extraction respectively based on the spectral information of each of the audio frames to obtain an audio feature of each of the audio frames comprises:

organizing a first number of preceding audio frames of the first audio frame, a first audio frame and a second number of follow-up audio frames of the first audio frame into a frame set, the preceding audio frames being audio frames located before the first audio frame, and the follow-up audio frames being audio frames located after the first audio frame; and performing the feature extraction on the spectral information of a plurality of audio frames in the frame set, and determining the extracted audio feature as the audio feature of the first audio frame, wherein the first audio frame is any audio frame in the audio data.

5. The method according to claim 2, wherein the performing feature recognition based on audio features of the audio frames to obtain the recognition result of each of the audio frames comprises:

performing feature transformation based on the audio features of a plurality of audio frames to obtain an associated feature of each of the audio frames, the associated feature of the audio frame indicating an association relationship between the audio frame and the preceding audio frames and the follow-up audio frames; and performing classification based on the associated feature of each of the audio frames to obtain the recognition result of each of the audio frames.

6. The method according to claim 1, wherein the recognition result of the audio frame is a classification numerical value, the classification numerical value indicates a possibility that the audio frame belongs to the music audio frame, and the determining a music segment in the audio data based on the recognition result of each of the audio frames comprises:
  determining the audio frame as a music audio frame when the classification numerical value of the audio frame is greater than a classification threshold; and
  organizing a plurality of consecutive music audio frames in the audio data into the music segment.

7. A computer device, comprising a processor and a memory, the memory storing at least one computer program that, when executed by the processor, causes the computer device to implement a video editing method including:
  performing music recognition on audio data in first video data using a music recognition model to obtain a recognition result of each of audio frames in the audio data, the recognition result indicating whether the audio frame belongs to a music audio frame;
  determining a music segment in the audio data based on the recognition results of the audio frames, further comprising:
    determining a first plurality of consecutive music audio frame followed by a second plurality of consecutive non-music audio frame in the audio data based on the recognition result of each of the audio frames;
    organizing the first plurality of consecutive music audio frames in the audio data into the music segment;
    organizing the second plurality of consecutive non-music audio frames into a non-music segment; and
    correcting the music segment in the audio data based on at least one of playback information of the music segment and playback information of the non-music segment; and
  extracting, from the first video data, a video clip with a same playback period as the music segment as second video data comprising the music segment.

8. The computer device according to claim 7, wherein the performing music recognition on audio data in first video data to obtain a recognition result of each of audio frames in the audio data comprises:
  extracting spectral information from each of the audio frames;
  performing feature extraction respectively based on the spectral information of each of the audio frames to obtain an audio feature of each of the audio frames; and
  performing feature recognition based on the audio features of the audio frames to obtain the recognition result of each of the audio frames.

9. The computer device according to claim 8, wherein the extracting spectral information from each of the audio frames comprises:
  performing frequency-domain transformation on each of the audio frames to obtain energy spectrum information of each of the audio frames; and
  filtering the energy spectrum information of each of the audio frames to obtain the spectral information of each of the audio frames.

10. The computer device according to claim 8, wherein the performing feature extraction respectively based on the spectral information of each of the audio frames to obtain an audio feature of each of the audio frames comprises:
  organizing a first number of preceding audio frames of the first audio frame, a first audio frame and a second number of follow-up audio frames of the first audio frame into a frame set, the preceding audio frames being audio frames located before the first audio frame, and the follow-up audio frames being audio frames located after the first audio frame; and
  performing the feature extraction on the spectral information of a plurality of audio frames in the frame set, and determining the extracted audio feature as the audio feature of the first audio frame,
  wherein the first audio frame is any audio frame in the audio data.

11. The computer device according to claim 8, wherein the performing feature recognition based on audio features of the audio frames to obtain the recognition result of each of the audio frames comprises:
  performing feature transformation based on the audio features of a plurality of audio frames to obtain an associated feature of each of the audio frames, the associated feature of the audio frame indicating an association relationship between the audio frame and the preceding audio frames and the follow-up audio frames; and
  performing classification based on the associated feature of each of the audio frames to obtain the recognition result of each of the audio frames.

12. The computer device according to claim 7, wherein the recognition result of the audio frame is a classification numerical value, the classification numerical value indicates a possibility that the audio frame belongs to the music audio frame, and the determining a music segment in the audio data based on the recognition result of each of the audio frames comprises:
  determining the audio frame as a music audio frame when the classification numerical value of the audio frame is greater than a classification threshold; and
  organizing a plurality of consecutive music audio frames in the audio data into the music segment.

13. A non-transitory computer-readable storage medium, storing at least one computer program that, when executed by a processor of a computer device, causes the computer device to implement a video editing method including:
  performing music recognition on audio data in first video data using a music recognition model to obtain a recognition result of each of audio frames in the audio data, the recognition result indicating whether the audio frame belongs to a music audio frame;
  determining a music segment in the audio data based on the recognition results of the audio frames, further comprising:
    determining a first plurality of consecutive music audio frame followed by a second plurality of consecutive non-music audio frame in the audio data based on the recognition result of each of the audio frames;
    organizing the first plurality of consecutive music audio frames in the audio data into the music segment;
    organizing the second plurality of consecutive non-music audio frames into a non-music segment; and
    correcting the music segment in the audio data based on at least one of playback information of the music segment and play back information of the non-music segment; and
  extracting, from the first video data, a video clip with a same playback period as the music segment as second video data comprising the music segment.

14. The non-transitory computer-readable storage medium according to claim 13, wherein the performing music recognition on audio data in first video data to obtain a recognition result of each of audio frames in the audio data comprises:

extracting spectral information from each of the audio frames;

performing feature extraction respectively based on the spectral information of each of the audio frames to obtain an audio feature of each of the audio frames; and performing feature recognition based on the audio features of the audio frames to obtain the recognition result of each of the audio frames.

15. The non-transitory computer-readable storage medium according to claim 14, wherein the extracting spectral information from each of the audio frames comprises:

performing frequency-domain transformation on each of the audio frames to obtain energy spectrum information of each of the audio frames; and filtering the energy spectrum information of each of the audio frames to obtain the spectral information of each of the audio frames, wherein the first audio frame is any audio frame in the audio data.

16. The non-transitory computer-readable storage medium according to claim 14, wherein the performing feature recognition based on audio features of the audio frames to obtain the recognition result of each of the audio frames comprises:

performing feature transformation based on the audio features of a plurality of audio frames to obtain an associated feature of each of the audio frames, the associated feature of the audio frame indicating an association relationship between the audio frame and the preceding audio frames and the follow-up audio frames; and performing classification based on the associated feature of each of the audio frames to obtain the recognition result of each of the audio frames.

17. The non-transitory computer-readable storage medium according to claim 13, wherein the recognition result of the audio frame is a classification numerical value, the classification numerical value indicates a possibility that the audio frame belongs to the music audio frame, and the determining a music segment in the audio data based on the recognition result of each of the audio frames comprises:

determining the audio frame as a music audio frame when the classification numerical value of the audio frame is greater than a classification threshold; and organizing a plurality of consecutive music audio frames in the audio data into the music segment.

* * * * *